(12) United States Patent
Christensen et al.

(10) Patent No.: US 8,453,995 B2
(45) Date of Patent: Jun. 4, 2013

(54) CONTROL BARRIER

(75) Inventors: Marc E. Christensen, Salt Lake City, UT (US); David J. Lipniarski, North Tonawanda, NY (US)

(73) Assignee: Off the Wall Products, LLC, Salt Lake City, UT (US)

( * ) Notice: Subject to any disclaimer, the term of this patent is extended or adjusted under 35 U.S.C. 154(b) by 467 days.

(21) Appl. No.: 12/133,316

(22) Filed: Jun. 4, 2008

(65) Prior Publication Data

US 2009/0001334 A1 Jan. 1, 2009

Related U.S. Application Data

(60) Provisional application No. 60/946,880, filed on Jun. 28, 2007.

(51) Int. Cl.
*E01F 15/10* (2006.01)

(52) U.S. Cl.
USPC .......................................... 256/13.1

(58) Field of Classification Search
USPC ................ 256/13.1, 24, 26, 73; 404/6, 9
See application file for complete search history.

(56) References Cited

U.S. PATENT DOCUMENTS

| 4,040,759 A | 8/1977 | Skalle |
| 4,143,857 A | 3/1979 | Weiner |
| 4,357,000 A * | 11/1982 | Tisbo et al. ...................... 256/26 |
| 4,498,660 A | 2/1985 | Brema et al. |
| 4,614,181 A | 9/1986 | Karlsson |
| 4,681,302 A | 7/1987 | Thompson |
| 4,854,767 A | 8/1989 | Sasaki |
| 4,869,018 A | 9/1989 | Scales et al. |
| 4,900,090 A * | 2/1990 | Davis ............................ 403/381 |
| 5,011,325 A | 4/1991 | Antoniol |
| 5,022,781 A | 6/1991 | Smith |
| 5,080,523 A | 1/1992 | Steiner |
| 5,123,773 A | 6/1992 | Yodock |
| 5,197,601 A | 3/1993 | Sterett |
| 5,259,154 A | 11/1993 | Lilley |
| 5,387,049 A | 2/1995 | Duckett |
| 5,498,101 A | 3/1996 | Braverman |
| 5,611,641 A | 3/1997 | Christensen |
| 5,639,179 A | 6/1997 | Jensen |
| D400,264 S | 10/1998 | Striefel et al. |

(Continued)

FOREIGN PATENT DOCUMENTS

| AU | B-50241/93 | 8/1994 |
| EP | 0 550 362 A1 | 7/1993 |

OTHER PUBLICATIONS gb.espacenet.com online translation. EP 0 550 362, Sodirel, Dec. 23, 1992.*

(Continued)

*Primary Examiner* — Michael P Ferguson
(74) *Attorney, Agent, or Firm* — Workman Nydegger

(57) ABSTRACT

A barrier includes a housing having an interior surface and an opposing exterior surface extending between a first end and an opposing second end, the interior surface bounding a chamber that is adapted to receive a ballast. A coupler is rigidly connected to the first end of the housing, the housing and the coupler being separate discrete members that are connected together after formation. A structure, such as an opening or a post, is formed on the coupler for removably connecting a separate barrier to the coupler.

16 Claims, 19 Drawing Sheets

U.S. PATENT DOCUMENTS

| | | | |
|---|---|---|---|
| 5,836,714 | A | 11/1998 | Christensen |
| 5,882,140 | A * | 3/1999 | Yodock et al. ............... 256/13.1 |
| 5,901,526 | A | 5/1999 | Vidmar et al. |
| 5,988,934 | A | 11/1999 | Wasserstrom |
| 6,059,487 | A | 5/2000 | Haga et al. |
| 6,086,285 | A | 7/2000 | Christensen |
| 6,102,375 | A * | 8/2000 | Colless et al. ............... 256/13.1 |
| 6,413,009 | B1 * | 7/2002 | Duckett ............................ 404/6 |
| D462,126 | S | 8/2002 | England |
| 7,226,236 | B2 * | 6/2007 | Mertens ............................ 404/6 |
| 7,416,364 | B2 * | 8/2008 | Yodock et al. ............... 256/13.1 |
| 7,811,025 | B2 * | 10/2010 | Kulp et al. ........................ 404/6 |
| 2002/0025221 | A1 | 2/2002 | Johnson |
| 2003/0219308 | A1 | 11/2003 | Boulais et al. |
| 2004/0057790 | A1 | 3/2004 | Tagg |
| 2007/0098490 | A1 | 5/2007 | Christensen |

OTHER PUBLICATIONS

Road Barriers by Oaklands Plastics Ltd., www.oaklandsplastic.com/safety-barriers/road-barriers.asp?Mn=31, published at least as early as Jun. 27, 2007.

Track Barriers by Oaklands Plastics Ltd., www.oaklandsplastic.com/safety-barriers/road-barriers.asp?Mn=31, published at least as early as Jun. 27, 2007.

Roo Guards Products, Safety Barricades, www.rooguards.com/products.htm, published at least as early as Jun. 27, 2007.

Multi-Barrier, Model AR-10x96 Specification, Jan. 2003.

Flyer by Armorcast entitled *Guardian Low Profile Barricade Portable Protection and Security To Keep your World in Control*, published at least as early as Jun. 3, 2008.

Fact sheet for Neubert Aero Corp., *Airport Low-Profile Barricade*, published Dec. 21, 2005.

* cited by examiner

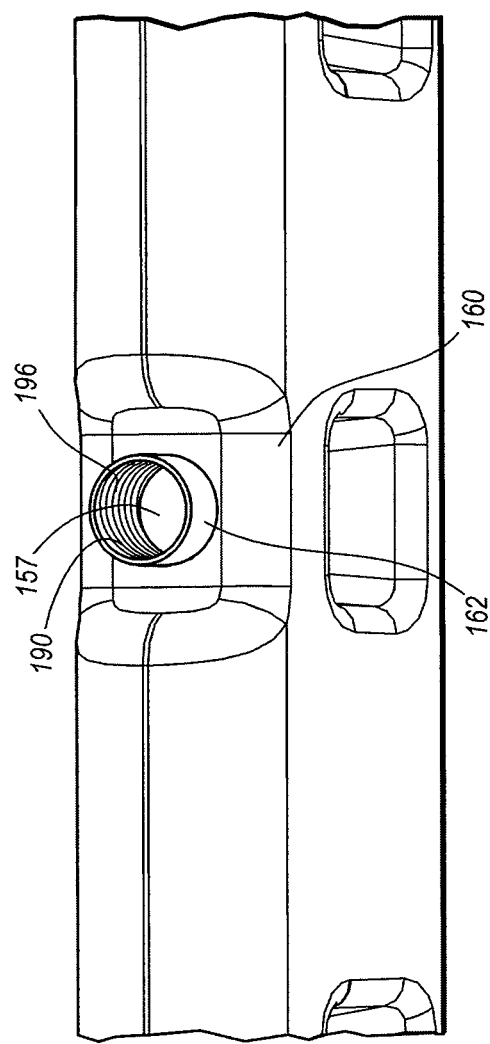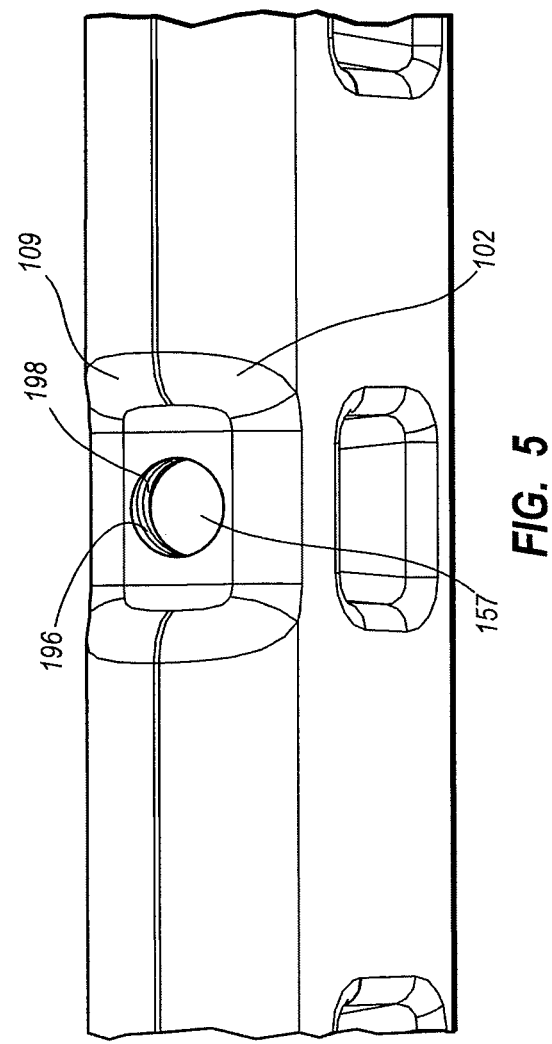

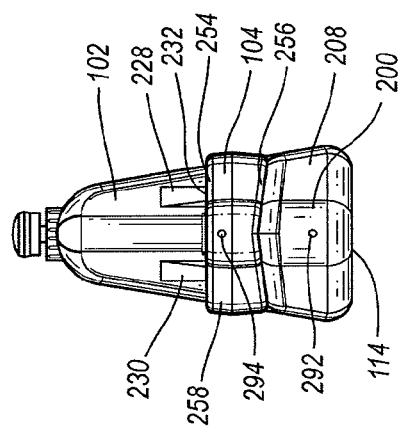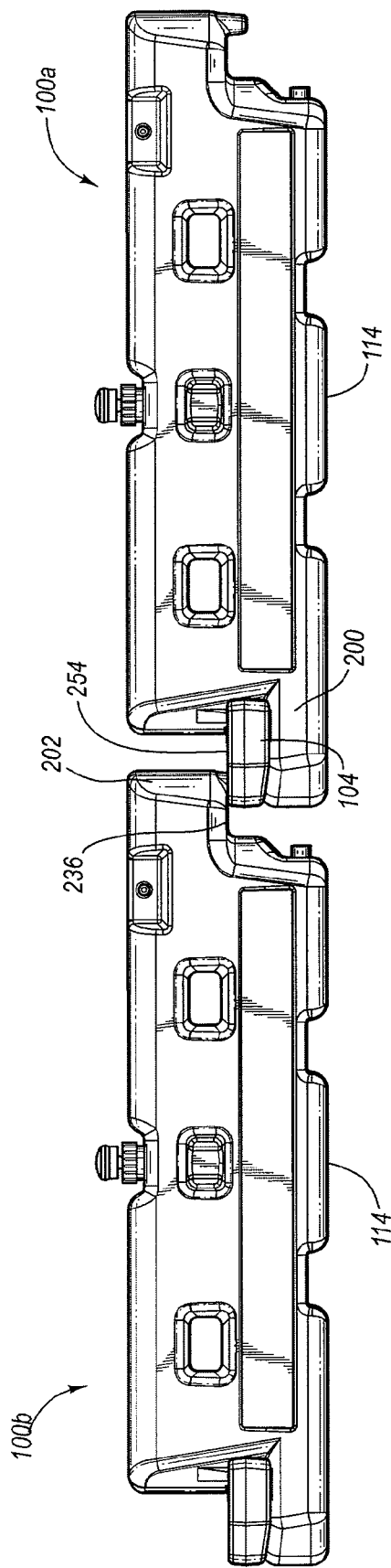

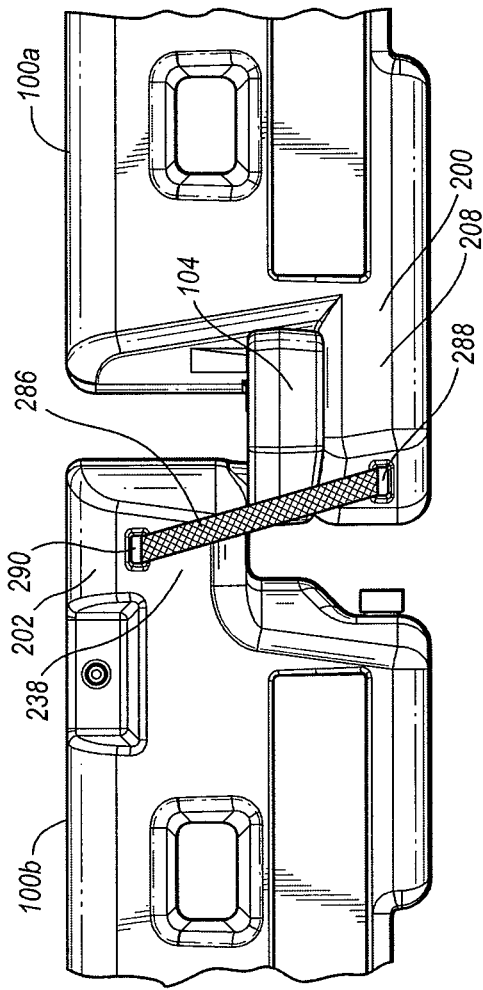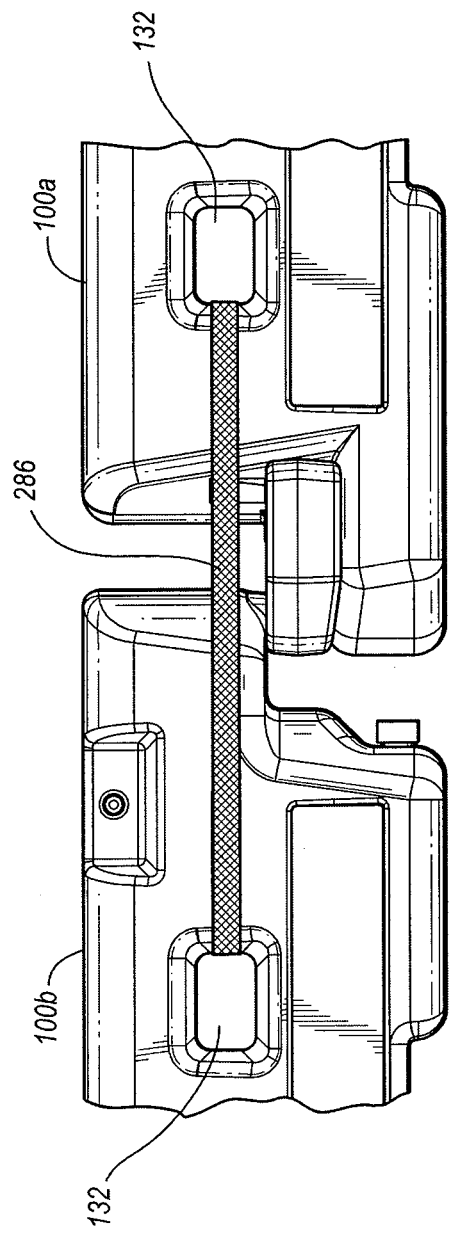

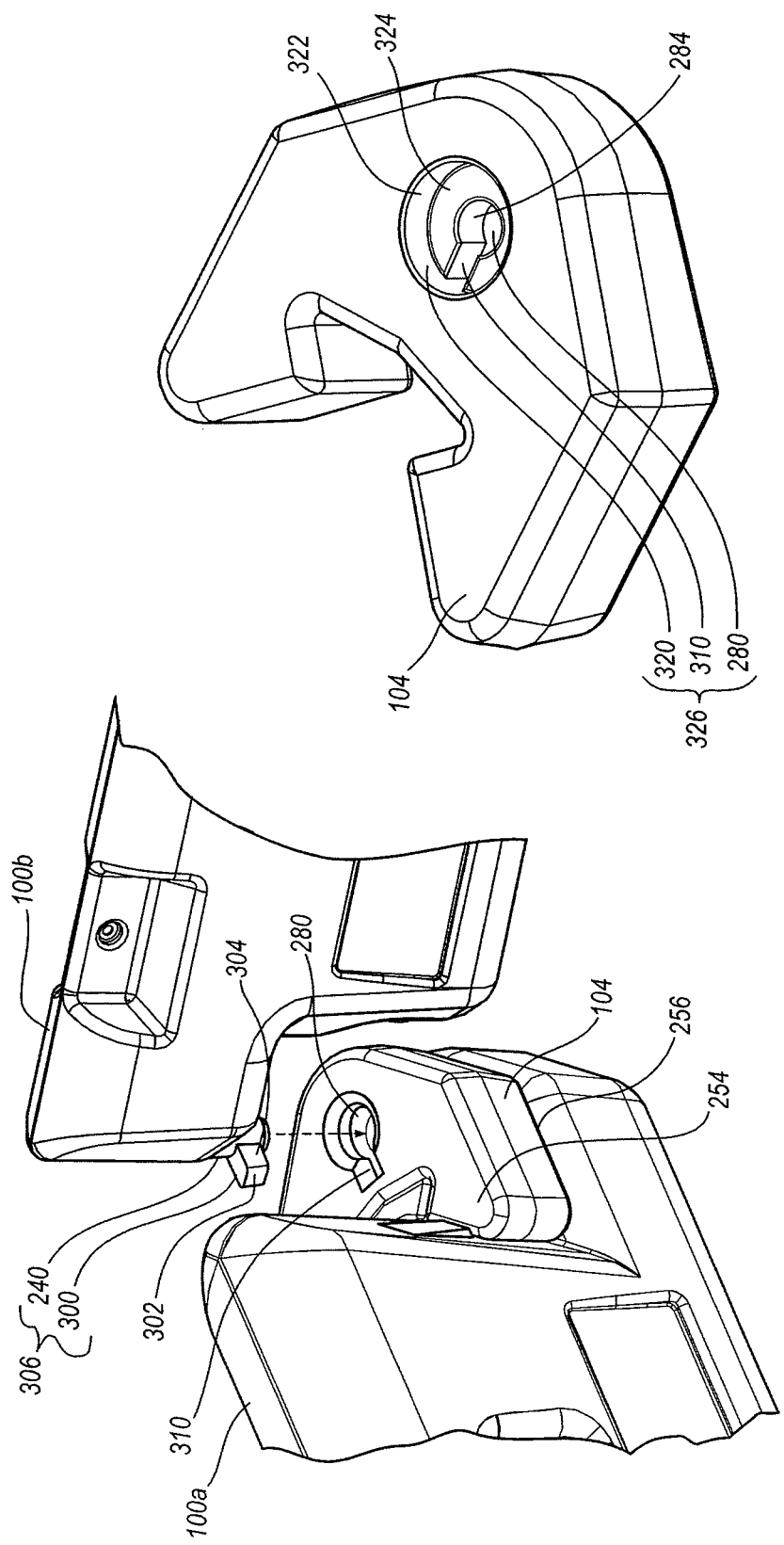

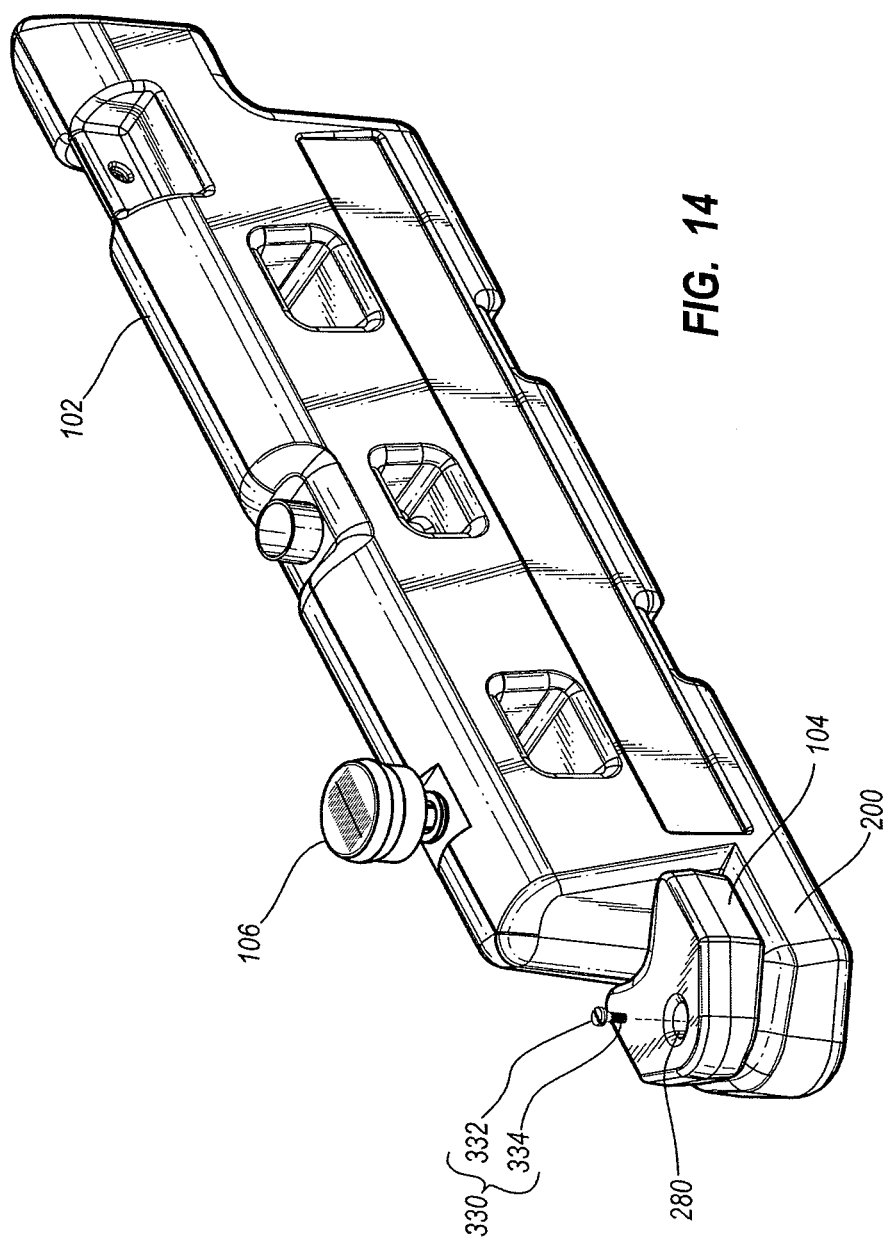

CONTROL BARRIER

CROSS-REFERENCE TO RELATED APPLICATIONS

This application claims priority to U.S. Provisional Application Ser. No. 60/946,880, filed Jun. 28, 2007, which for purposes of disclosure is incorporated herein by specific reference.

BACKGROUND OF THE INVENTION

1. The Field of the Invention

The present invention relates to barriers, and more particularly, portable, reusable, control barrier systems.

2. The Relevant Technology

Control barriers are used in a variety of situations. For example, control barriers can be selectively positioned at special events or construction sites to help direct pedestrian and automobile traffic in a desired direction. Similarly, control barriers can be used at airports to delineate construction zones and direct ground traffic and taxiing aircraft in a desired direction. Alternatively, control barriers can be put up to help limit access to select areas. In yet other embodiments, control barriers can be put up to define an entertainment stage or the boundaries of a playing field. For example, control barriers can be used to define the boundaries of a soccer field or an ice skating rink.

Conventional control barriers have long comprised individual sawhorse type barriers or collapsible V-shape barricades. Such barriers, however, have limited use since they are generally lightweight and are thus easily tipped over or moved. This can be a problem particularly when used in conjunction with aircraft where the barriers cannot withstand the propeller wash or jet blast produced by aircraft and will be blown over or blown out of position. Similar problems also occur when such conventional barrier are used in other high impact environments. Furthermore, such barriers are typically not connected and often have spaces or gaps extending therethrough. As such, it is possible for individuals, vehicles, or equipment to either slip between or through the barriers.

Other barriers comprise various gates or walls that are mechanically assembled. Such barriers, however, require extensive time to assemble and disassemble. In yet other alternative embodiments, concrete barriers have been used. Although concrete barriers are not easily tipped over and can withstand impact, such as the propeller wash or jet blast of aircraft, such barriers are extremely heavy. As such, they are difficult to move and place in desired locations. Often, special equipment such as fork lifts or cranes are required. Furthermore, concrete barriers can be both difficult and expensive to move over large distances and require a large area to store. Concrete barriers can also be dangerous in that they are rigid and non-forgiving when impacted by a person, car, or taxiing aircraft.

In one attempt to overcome some of the above problems, plastic barriers have been made. The plastic barriers are hollow and can be filled with water for stabilizing. Although an improvement, existing plastic barriers also have several limitations. For example, to mold plastic barrier that have interlocking features, it is typically necessary to use a rotational molding process requiring complex multi-part molds. The requirement of using such molds and molding process increases the mold cost and slows production time, thereby significantly increasing the cost of the barriers.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

FIGS. 4 and 5 are top perspective views of alternative embodiments of an inlet port according to the present invention;

FIG. 7 is an end view of one end of the barrier, with the coupler attached to the housing;

FIG. 8 is a side view of a pair of barriers shown in FIG. 1 coupled together;

FIGS. 11A and 11B are partial side views of the coupled pair of barriers shown in FIG. 8 with additional means for connecting the barriers;

FIG. 12 is a partial perspective view of an alternative method of connecting barriers;

FIG. 13 is a top perspective view of the coupler shown in FIG. 12;

FIG. 14 is a top perspective view of an alternative embodiment of a barrier according to the present invention;

DETAILED DESCRIPTION OF THE PREFERRED EMBODIMENTS

As used in the specification and appended claims, directional terms, such as "up," "down," "left," "right," "upward," and "downward" are used herein solely to indicate relative directions in viewing the drawings and are not intended to limit the scope of the claims in any way.

Figure 1:
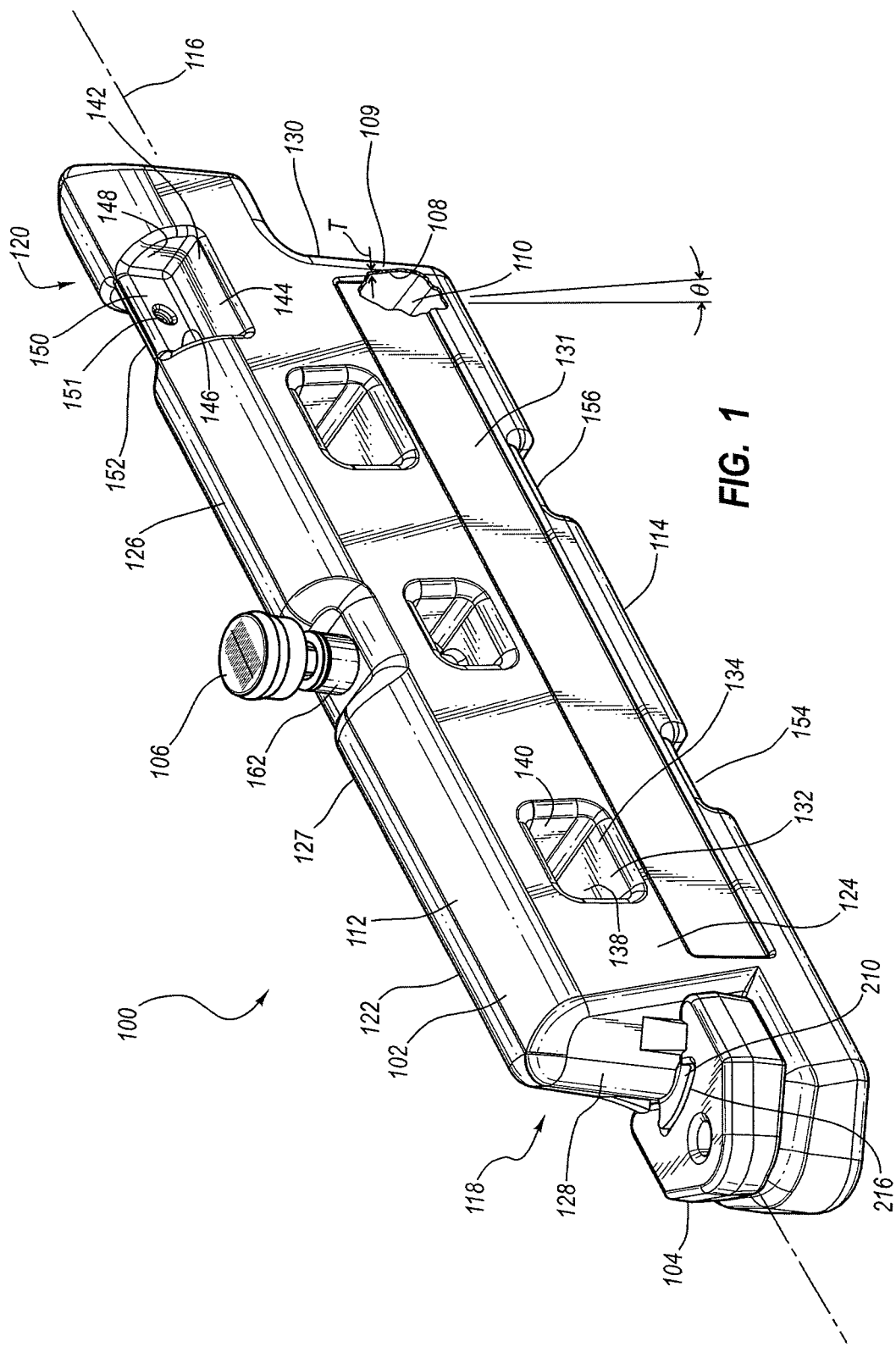
FIG. 1 is a top perspective view of one embodiment of a barrier according to the present invention.

Depicted in FIG. 1 is one embodiment of an inventive barrier 100 incorporating features of the present invention. Barrier 100 comprises a housing 102 and a separate, discrete coupler 104 removably attached thereto. Although not required, a light assembly 106 can also be removably attached to housing 102, as discussed in more detail below.

Housing 102 has an interior surface 108 and an opposing exterior surface 109, the interior surface 108 bounding a chamber 110 that is adapted to receive a ballast. As used in the specification and appended claims, the term "ballast" is broadly intended to include any materials which can be poured into internal chamber 110. By way of example and not by limitation, the ballast can include water, salt water, non-freezing fluids, sand, rock, cement, concrete, and the like.

Figure 2:
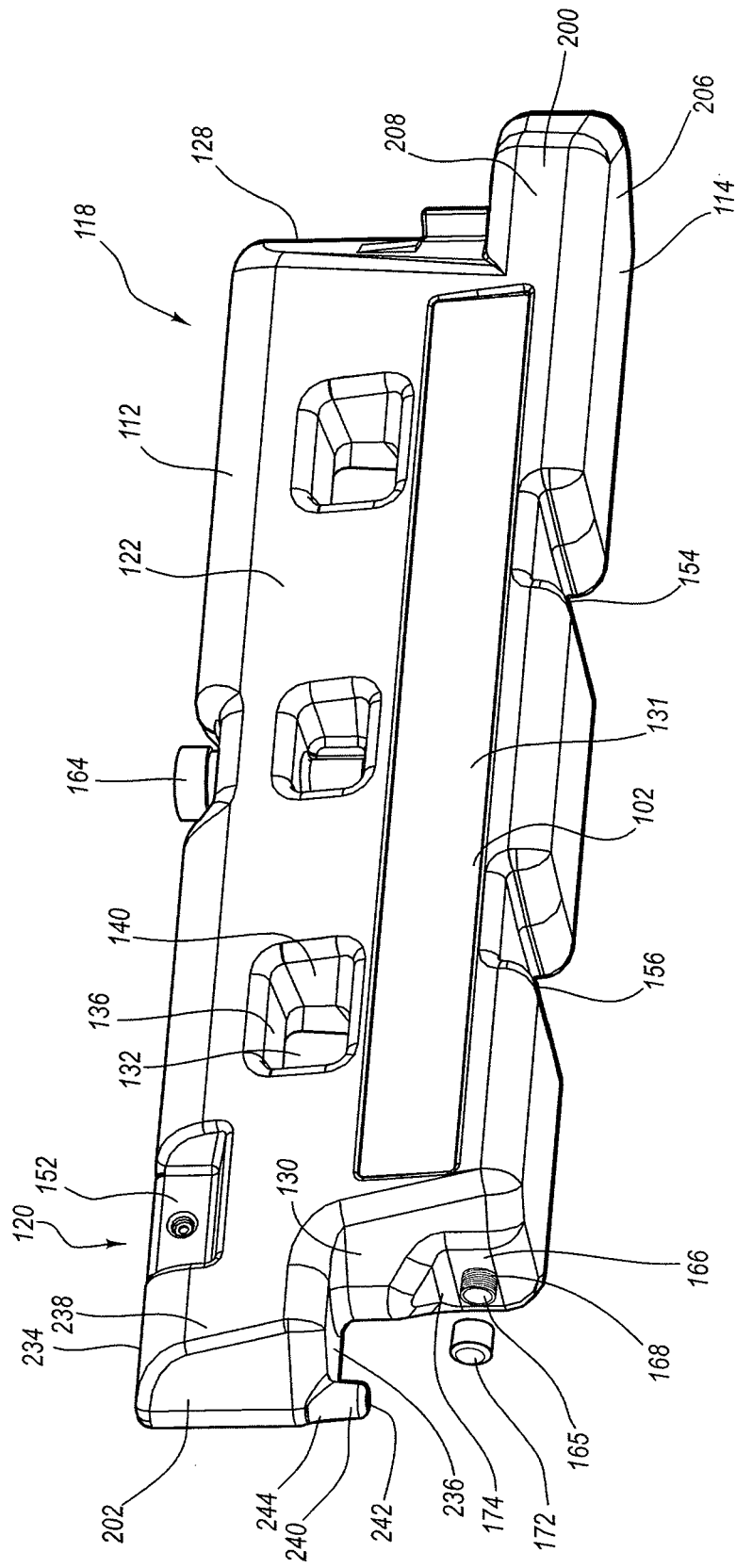
FIG. 2 is a bottom perspective view of the housing of the barrier shown in FIG. 1.

As shown in FIGS. 1 and 2, housing 102 comprises a central body portion 112 having a floor 114 and a longitudinal axis 116 extending between a first end 118 and an opposing second end 120. Central body portion 112 further comprises opposing side walls 122 and 124 extending between floor 114 and a top wall 126 at an upper portion 127 of housing 102. Floor 114, side walls 122 and 124, and top wall 126 each extend from a first end face 128 at the first end 118 of housing 102 to a second end face 130 disposed at the second end 120 of housing 102. First end face 128 and second end face 130 can be substantially flat, curved, or have other configurations. In the depicted embodiment, first end face 128 and second end face 130 are each curved outwardly so as to form a bowed surface between opposing sided walls 122 and 124.

Top wall 126 can be rounded, as depicted in FIG. 1, or can be flat, or have other shapes. Side walls 122 and 124 are depicted as sloping downward and away from top wall 126. That is, side walls 122 and 124 are relatively closer to each other where side walls 122 and 124 adjoin top wall 126 than where side walls 122 and 124 adjoin floor 114. In other embodiments, side walls 122 and 124 are relatively parallel to each other and in still other embodiments, side walls 122 and 124 can be relatively closer to each other where side walls 122 and 124 adjoin floor 114 than where side walls 122 and 124 adjoin top wall 126.

In one embodiment, a display portion 131 can be formed into one or both side walls 122 and 124 so that displays or other structures can be mounted on side walls 122 and/or 124. For example, as shown in FIG. 1, display portion 131 is recessed within side wall 124 and is substantially rectangular. In other embodiments, other shapes can be used. In the embodiment depicted, display portion 131 is sized so that reflective tape, such as a high intensity reflective sheeting, can be attached thereto. Alternatively, a reflective coating can be painted on or otherwise attached to display portion 131.

Display portion 131 can be sloped relative to the vertical to, e.g., reflect light upward toward a car driver or a pilot who may be many feet above the ground in an aircraft cockpit. The amount of slope of display portion 131 may or may not coincide with the slope of side wall 124. That is the slope of display portion 131 relative to vertical may be the same as side wall 124 or may be different. In the embodiment depicted, display portion 131 angles inward toward side wall 122 as display portion 131 rises toward top wall 126. The slope is such that the distance between display portion 131 and side wall 122 is greatest near floor 114 than near the top of display portion 131. For example, in the embodiment depicted, display portion 131 forms an angle θ of about three degrees relative to vertical. In alternative embodiments, angle θ can be in a range between about 2 degrees to about 15 degrees with about 2 degrees to about 10 degrees or about 2 degrees to about 5 degrees being more preferred. Other angles can also be used. It is appreciated that side wall 122 can include a display portion 131 in like manner to side wall 124 (see FIG. 2). Thus, in other embodiments display portions 131 can be disposed in parallel planes, can each slope in intersecting planes, or one wall can be vertical while the other wall slopes relative thereto.

Although not required, in the depicted embodiment of the present invention, one or more through holes 132 are formed in barrier 100 which extend through housing 102 between side wall 122 and sidewall 124. In part, through holes 132 function to provide structural strength and stability to barrier 100. Each through hole 132 is bounded by a perimeter wall 134 having a top portion 136, a bottom portion 138 and two side portions 140 that each extend through barrier 100. Although depicted as having a substantially rectangular cross section, each through hole 132 can alternatively have a circular or other cross sectional shape. In other embodiments, instead of extending all the way through barrier 100, a partition can be formed to divide through hole 132 into separate recesses. That is, portions of side walls 122 and 124 can be recessed and centrally connected by forming a kiss-off. Examples of kiss-offs that can be used in the present invention are disclosed in U.S. patent application Ser. No. 11/360,820, filed Feb. 23, 2006 and entitled Barriers with Interlocking Sides which is incorporated herein by specific reference.

In some embodiments a recess 142 is formed at upper portion 127 of housing 102. Recess 142 is formed on top wall 126 and side wall 124. Recess 142 is bounded by a floor 144, opposing sidewalls 146 and 148, and a partition wall 150. Partition wall 150 can be formed between recess 142 and side wall 122. If desired, a threaded hole 151 can be formed on partition wall 150. Recess 142 is typically used to receive a light source which is attached by a bolt that passes through the light source and is screwed into threaded hole 151. An example of a light source and alternative configurations and uses for recess 142 that can be used in the present invention are disclosed in U.S. patent application Ser. No. 11/360,820 which was previously incorporated herein by specific reference.

As depicted in FIGS. 1 and 2, a second recess 152 can be formed on top wall 126 and side wall 122. Second recess 152 enables the light source to be mounted on either side of barrier 100. Partition wall 150 can then be formed between recess 142 and second recess 152 on side wall 122. In one embodiment, recess 142 has a width extending between sidewalls 146 and 148 that is typically in a range between about 10 cm to about 30 cm, a height extending between floor 144 and the top surface of top wall 126 in a range between about 10 cm to about 30 cm, and a depth between about 10 cm to about 30 cm. Other dimensions can also be used.

In the depicted embodiment, second recess 152 is substantially similar in size and composition to recess 142. In alternative embodiments, second recess 152 can be smaller or larger than recess 142. In the embodiment shown, recesses 142 and 152 extend into side walls 122 and 124, respectively. In alternative embodiments, it is appreciated that either of recesses 122 or 124 can be formed as a pocket that is recessed only into top wall 126 but does not extend through either of side walls 122 or 124. In other embodiments, partition wall 150 can be omitted completely. Other configurations can also be used.

Continuing with FIGS. 1 and 2, a pair of spaced apart fork lift channels 154 and 156 is recessed on floor 114 and extends from side wall 122 to side wall 124. Fork lift channels 154 and 156 are configured to receive the tines of a fork lift such that, if desired, barrier 100 can be moved by a fork lift even if filled with ballast. If desired, pads comprised of rubber, old car tires, or other material having a higher coefficient of friction than barrier 100, can be secured to floor 114 to increase the coefficient of friction of barrier 100.

Figure 3:
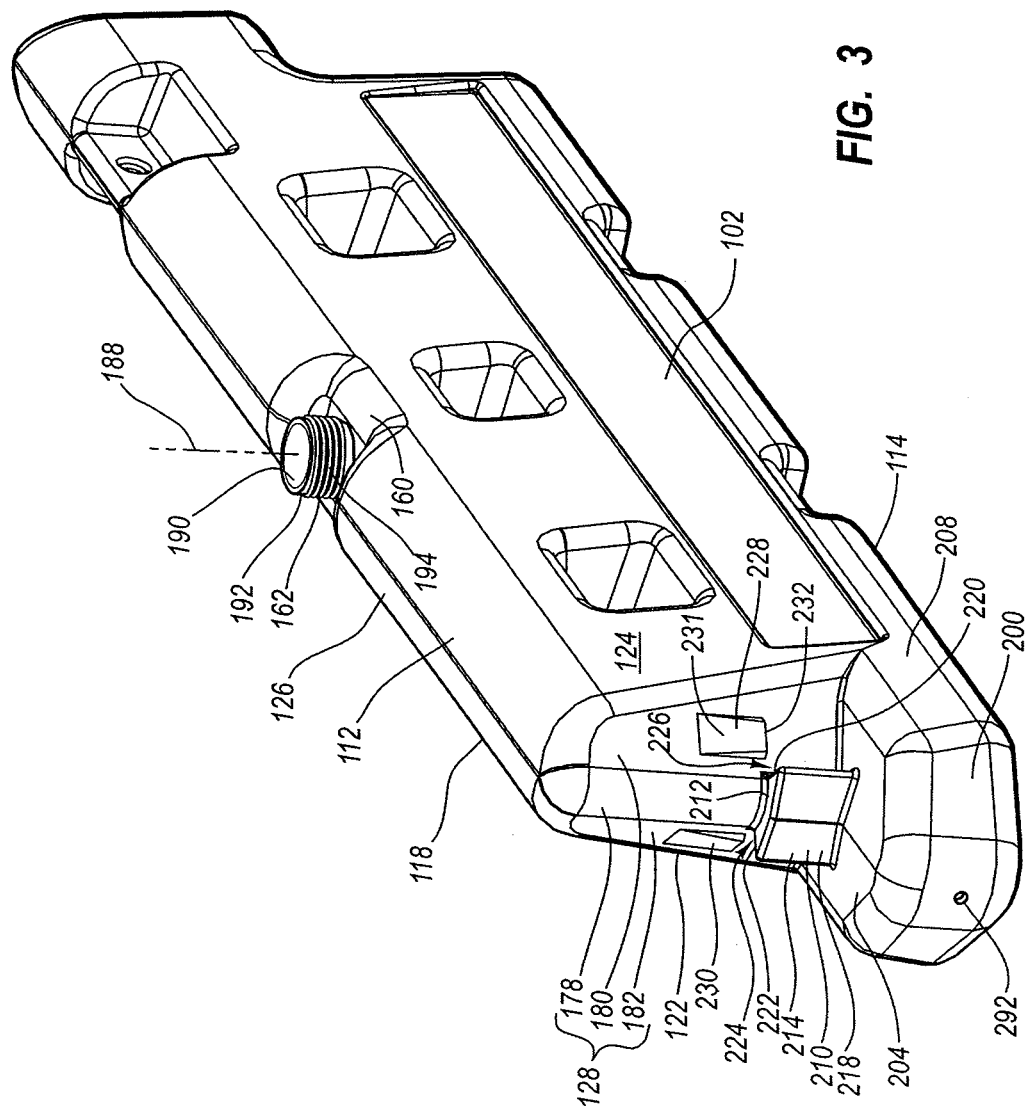
FIG. 3 is a top perspective view of one end of the housing of the barrier shown in FIG. 1, with the coupler removed from the barrier.

Turning to FIG. 3 in conjunction with FIG. 1, a notch 160 is formed on top wall 126. Outwardly projecting from notch 160 is a tubular stem 162. Stem 162 has an inside surface 190 and an opposing outside surface 192. Inside surface 190 bounds an inlet port 157 having a central axis 188. Inlet port 157 extends through housing 102 so as to communicate with chamber 110. Accordingly, barrier 100 can be filled with ballast by passing the ballast through inlet port 157 and into chamber 110.

A helical thread 194 is formed on outside surface 192 of stem 162. Inlet port 157 can be selectively closed or sealed by a cap 164 (FIG. 2) having an inside helical thread corresponding to the helical thread 194 formed on stem 162 so as to allow cap 164 to threadedly engage stem 162. As will be discussed below in greater detail, inlet port 157 can also be selectively closed by light assembly 106 (FIG. 1) so as to eliminate the need for cap 164. Stem 162 can be separately connected to housing 102 or can be integrally formed as a unitary member with housing 102. Notch 160 provides a partially protected space for stem 162 and related cap 164 or light assembly 106.

In one alternative as shown in FIG. 4, a helical thread 196 can be formed on the inside surface 190 of stem 162. A corresponding plug (not shown) having a matching outside helical thread can be selectively screwed into stem 162 so as to close or seal inlet port 157.

In another embodiment, as shown in FIG. 5, stem 162 is omitted altogether. In this embodiment, the helical thread 196 is formed on a sidewall 198 of housing 102 that encircles inlet port 157. Sidewall 198 can be formed on a portion of housing 102 within notch 160 or elsewhere on housing 102. It is appreciated that, inlet port 157 can be positioned at other locations on barrier 100 and can be formed within or without of notch 160. For example, inlet port 157 can be formed with or without stem 162 directly on housing 102 anywhere on top wall 126.

Returning to FIG. 2 in conjunction with FIG. 1, second end face 130 of housing 102 has a lower portion 166 near floor 114 that is recessed. Outwardly projecting from second end face 130 within lower portion 166 is a threaded tubular stem 168. Stem 168 bounds an outlet port 165 that extends through housing 102 so as to communicate with chamber 110. By virtue of its position near floor 114, outlet port 165 can be used to selectively drain ballast from barrier 100.

A cap or plug 172 can be screwed into or onto or otherwise attached to stem 168 so as to seal outlet port 165 closed. In alternative embodiments, outlet port 165 can be positioned at other locations on barrier 100. Likewise, as with inlet port 157, outlet port 165 can be formed without stem 168. It is noted that by recessing lower portion 166, a partially protected space is provided for stem 168 and related cap or plug 172.

Returning to FIG. 3, first end face 128 comprises a central end face portion 178, a front end face portion 180 extending from side wall 124 to central end face portion 178 and a back end face portion 182 extending from side wall 122 to central end face portion 178. As depicted, front and back end face portions 180 and 182 form an angle with side walls 122 and 124 so that central end face portion 178 extends further out from first end. In other embodiments, front end face portion, 180, back end face portion 182, and central end face portion 178 are configured so that first end face 128 is substantially flat or extends inwardly.

As shown in FIGS. 2 and 3, housing 102 further includes a first projection portion 200 and a second projection portion 202 respectively projecting longitudinally outward from first end face 128 and second end face 130 of central body portion 112. Projections 200 and 202 are configured such that for identical housings 102, the second projection portion 202 of one housing can overlap a coupler 104 mounted onto the first projection portion 200 of the other housing while the floor 114 of both housings are resting on a common support surface, as discussed in further detail below.

As shown in FIGS. 2 and 3, first projection portion 200 comprises a top surface 204 and an opposing bottom surface 206 with a perimeter sidewall 208 extending therebetween. In the embodiment depicted, bottom surface 206 of first projection portion 200 lies in the same plane as floor 114 of central body portion 112 and is thus substantially horizontally displaced. Bottom surface 206 alternatively can lie in a different plane than floor 114. Top surface 204 projects longitudinally outward from first end face 128 on first end 118 and is substantially parallel to bottom surface 206 and thus substantially horizontally disposed in the embodiment depicted. Perimeter sidewall 208 extends between top surface 204 and bottom surface 206. First projection portion 200 angles in on a distal end such that the end of first projection portion 200 comes to a point or is substantially semi-circular when viewed from a position perpendicular to bottom surface 206 of first projection 200. In the embodiment depicted, one end of sidewall 208 attaches to central body portion 112 and lies in the same plane as side wall 122 and the other end of sidewall 208 attaches to central body portion 112 and lies in the same plane as side wall 124.

In one embodiment of the present invention means are provided for securing coupler 104 to housing 102 after coupler 104 and housing 102 are separately formed. This means for securing can be a selectively removable connection or a permanent connection. By way of example and not by limitation, a tenon and mortise arrangement can be used to interlock coupler 104 to housing 102 as shown in FIG. 1. Specifically, as depicted in FIG. 3, a tenon 210 projects from the central end face portion 178 of the first end face 128 of central body portion 112 and from the top surface 204 of first projection portion 200. Tenon 210 comprises a top tenon surface 212 and a perimeter tenon sidewall 214 extending down from top tenon surface 212 to top surface 204 of first projection portion 200. Both ends of perimeter tenon sidewall 214 attach to first end face 128 of central body portion 112.

In the depicted embodiment, tenon sidewall 214 comprises a front face 218 and two side faces 220 and 222 that extend from front face 218 to first end face 128 of central body portion 112. Side faces 220 and 222 angle in towards each other as they extend away from front face 218 to first end face 128 of central body portion 112 so as to form channels 224 and 226 on either side of tenon 210. Expressed in other terms, tenon 210 inwardly tapers as it extends from front face 218 of tenon 210 to central body portion 112. In alternative embodiments, tenon 210 can project only from first end face 128 of central body portion 112 or only from top surface 204 of first projection portion 200.

In the depicted embodiment, locking members 228 and 230 are formed on first end face 128 of central body portion 112, on each side of tenon 210, to help prevent unwanted vertical separation between coupler 104 and housing 102. Each locking member 228 and 230 comprises a top surface 231 that gradually slopes down and away from first end face 128 so as to form a ramp. Each top surface 231 terminates at a bottom surface 232 that extends at a shaper angle back into first end face 128.

Figure 6:
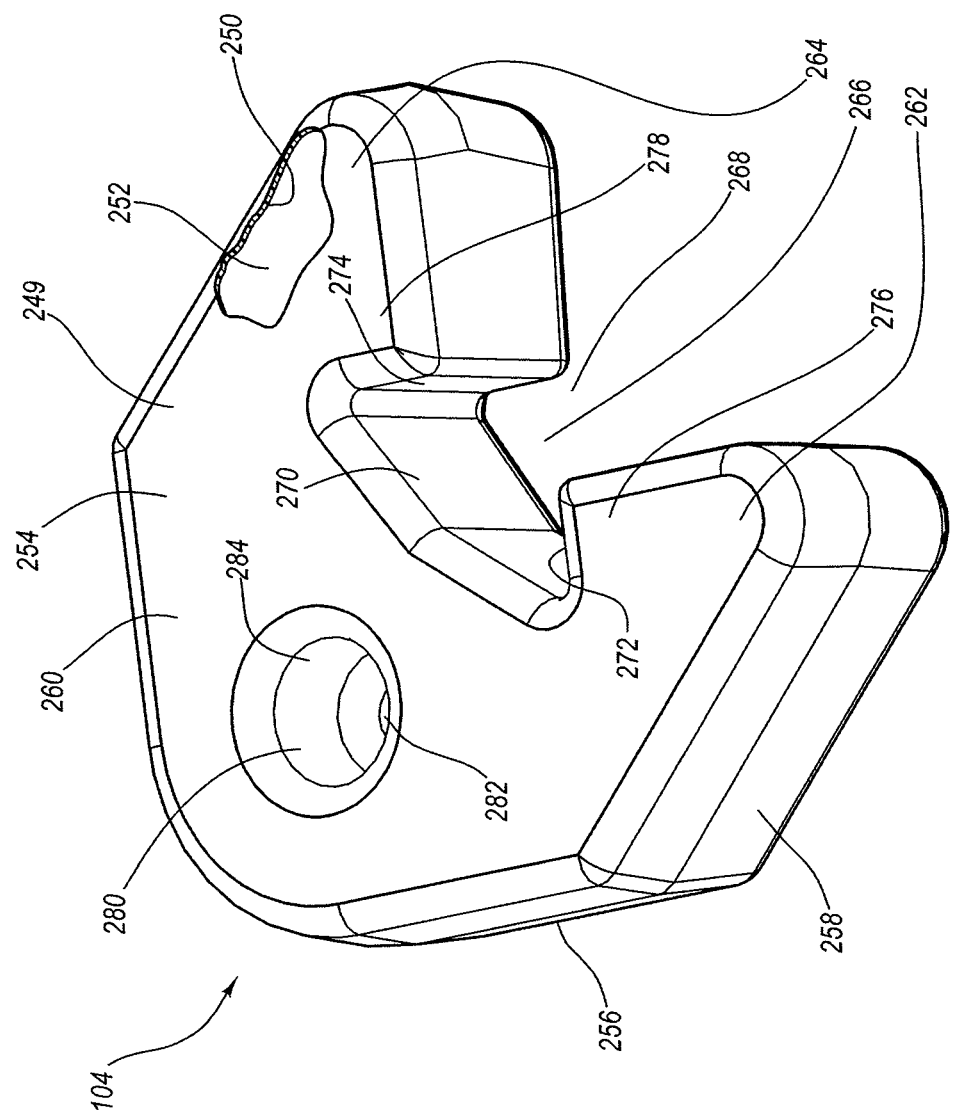
FIG. 6 is a top perspective view of the coupler of the barrier shown in FIG. 1.

Turning to FIG. 6, coupler 104 has an exterior surface 249 and an interior surface 250 bounding a compartment 252. In one alternative, coupler can be formed as a solid structure. Coupler 104 comprises a top wall 254 and a spaced apart bottom wall 256 with a perimeter sidewall 258 extending therebetween. In the depicted embodiment, top wall 254 and bottom wall 256 are substantially planar and are disposed in substantially parallel alignment. Top wall 254 is also typically substantially parallel to floor 114 of housing 102 when coupler 104 is connected to housing 102. In other embodiments, top wall 254 can be tilted so as to not be parallel to floor 114 and/or bottom wall 256. In other embodiments, top wall 254 can be non-planar having any desired configuration. Bottom wall 256 is configured to match the contour of top surface 204 of first projection portion 200 so that bottom wall 256 will rest on top surface 204 when coupler 104 is connected to housing 102, as shown in FIG. 7.

With reference to FIG. 6, coupler 104 further includes an opening 280 formed on top wall 254 of coupler 104 and extending toward bottom wall 256. Opening 280 is bounded by a floor 282 and an annular sidewall 284 extending from top wall 254 to floor 282. In some embodiments, end wall 282 is omitted. In those embodiments, sidewall 284 extends all the way through coupler 104 between top wall 254 and bottom wall 256. Although depicted as having a substantially circular transverse cross-sectional configuration, in other alternative embodiments opening 280 can have an oblong, irregular, or polygonal transverse cross-sectional configuration. As discussed below, opening 280 is sized and shaped to selectively engage with an identical second barrier 100.

Coupler 104 is configured to connect with tenon 210 of housing 102. Specifically, coupler 104 is substantially U-shaped and comprises a main body 260 having arms 262 and 264 extending from opposing sides thereof. Main body 260 and arms 262, 264 partially bound a mortise 266 having an open mouth 268 formed between arms 262 and 264. Mortise 266 extends completely through coupler 104 between top wall 254 and bottom wall 256. Arms 262 and 264 include projection portions 276 and 278, respectively, which extend toward each other so as to cause mortise 266 to constrict at mouth 268. Specifically, mortise 266 is bounded by a back wall 270 of body 260 and two side walls 272 and 274 which comprise portions of arm 262 and 264, respectively. Side walls 272 and 274 taper toward each other as they extend away from back wall 270. As such, mortise 266 has a dovetail or generally triangular transverse cross section that is complementary to tenon 210. Back wall 270 and opposing side walls 272 and 274 are depicted as being substantially vertical so as to allow mortise 216 to vertically slide over tenon 210 in an interlocking dovetail type connection.

To mount coupler 104 onto housing 102, coupler 104 is vertically placed over first projection portion 200 of housing 102 so that mortise 216 formed on coupler 104 is directly above tenon 210 formed on housing 102. Coupler 104 is then pushed down so that projection portions 276 and 278 of coupler 104 are received into channels 224 and 226 formed by tenon 210 and so that tenon 210 is received into mortise 266. As coupler 104 is slid over tenon 210, arms 262 and 264 of coupler 104 biases against outwardly projecting locking members 228 and 230. Due to slight resilient deformation in arms 262 and 264 and/or locking members 228 and 230, coupler 104 is able to pass over locking member 228 and 230 under the applied vertical downward force.

Once coupler 104 has completely passed over locking members 228 and 230 so that tenon 210 is received within mortise 266 and coupler 104 rests upon top surface 204 of first projection 200, as shown in FIG. 7, arms 262 and 264 and/or locking members 228 and 230 resiliently rebound to their natural resting position. In this position, locking members 228 and 230 project out over a small portion of coupler 104 so as to prevent coupler 104 from unintentionally vertically separating off of tenon 210. In this resting position, the engagement between tenon 210 and mortise 266 prevents coupler 104 from being horizontally detached from housing 102 and also provides a substantially rigid connection between housing 102 and coupler 104. That is, when coupled as described using the tenon and mortise arrangement, coupler 104 is precluded from laterally, vertically or rotationally moving with respect to housing 102. In some embodiments, locking members 228 and 230 are designed to allow coupler 104 to be removed when a predetermined amount of lifting force is exerted on coupler 104.

It is appreciated that other methods and structures can also be used for securing coupler 104 to housing 102. For example, it is appreciated that tenon 210 and mortise 266 can have a variety of different interlocking configurations. In still other embodiments, it is appreciated that tenon 210 can be formed on coupler 104 and that mortise 266 can be formed on housing 102. In still other embodiments, the mortise and tenon can be eliminated. For example, coupler 104 and housing 102 can be connected together by welding, adhesive, press fit connection, bolts, screws, rivets, latches, and other types of fasteners.

Depicted in FIG. 14 is one specific example of connecting coupler 104 to housing 102 without the use of a mortise and tenon. As shown in FIG. 14, a bolt 330 having a head 332 and a threaded shaft 334 extending therefrom is used to secure coupler 104 to first projection portion 200 of housing 102. A matching receiving member, such as a nut (not shown) is formed within or attached to top surface 204 of first projection portion 200.

A hole is formed through floor 282 (FIG. 6) of opening 280 of coupler 104. The hole extends through coupler 104 and is sized so as to allow shaft 332 to pass therethrough while preventing head 332 from passing therethrough. The nut is threaded to match the threads on shaft 334 and is positioned so as to correspond to the location of the hole formed on bottom wall 256 of coupler 104 when coupler 104 is mounted on housing 102.

Once coupler 104 is positioned on housing 102, shaft 334 of bolt 330 is passed through the hole and screwed into the nut disposed on first projection portion 200 by rotating bolt 330 in a particular direction. To disengage coupler 104 from housing 102, bolt 330 is unscrewed from the nut by rotating bolt 330 in the opposite direction. In other embodiments, a screw, rivet, expansion bolt or other type of fastener can be used in place of bolt 330, as it known in the art. In still another embodiment, the hole for bolt 330 need not be aligned with opening 280 but can be formed at any location that extends through coupler 104. Other methods of connection can also be used.

Turning to the other end of housing 102 as depicted in FIG. 2, second projection portion 202 projects longitudinally outward from second end face 130 of central body portion 112. Second projection portion 202 comprises a top surface 234 and an opposing bottom surface 236 with a perimeter sidewall 238 extending therebetween.

In the embodiment depicted, top surface 234 of second projection portion 202 follows the same contour as top wall 126 of central body portion 112. Top surface 234 alternatively can follow a different contour than top wall 126 or lie in a single plane. Bottom surface 236 projects longitudinally outward from second end face 130 on second end 120 and is substantially parallel to top surface 204 of first projection portion 200.

In one embodiment, bottom surface 236 of second projection portion 202 has an elevational location higher than top surface 204 of first projection portion 200 when the floor 114 of central body portion 112 is disposed on a level ground surface. Bottom surface 236 typically has an elevational location substantially equal to or above top wall 254 of coupler 104 when coupler 104 is mounted on first projection portion 200 and when floor 114 of central body portion 112 is disposed on a level ground surface. The term "above" is defined as being a further distance away from floor 114.

Similar to first projection portion 200, second projection portion 202 angles in on a distal end such that the end of second projection portion 202 comes to a point or is substantially semi-circular when viewed from a position perpendicular to bottom surface 236 of second projection 202. In the embodiment depicted, one end of sidewall 238 attaches to central body portion 112 and lies in the same plane as side wall 122 and the other end attaches to central body portion 112 and lies in the same plane as side wall 124.

Projecting downward from bottom surface 236 of second projection portion 202 is a post 240. Post 240 comprises a bottom face 242 at a bottom end 243 of post 240 with a perimeter sidewall 244 extending between bottom face 242 and bottom surface 236 of second projection portion 202. Post 240 is depicted has having a substantially circular cross-sectional shape. In other embodiments, post 240 can alternatively have a polygonal, oblong, or any other cross-sectional shape.

As depicted in FIG. 8, because bottom surface 236 of second projection portion 202 is either in the same plane as or above top wall 254 of coupler 104, the second projection portion 202 of one housing 100b can overlap the coupler 104 mounted to first projection portion 200 of another identical housing 100a while floors 114 of both housings are resting on a common support surface. In one embodiment of the present invention means are provided for removably connecting a separate barrier to coupler 104. By way of example and not by limitation, the means for removably connecting can comprise the opening 280 (FIG. 6) formed on coupler 104, opening 280 being configured to receive post 240. That is, by inserting post 240 of barrier 100b into opening 280 formed on coupler 104 of first barrier 100a, barrier 100b is connected to barrier 100a in that the barriers cannot be horizontally separated.

Although opening 280 has been disclosed as being disposed on top wall 254 of coupler 104 and post 240 has been disclosed as projecting from bottom surface 236 of second projection portion 202, it is appreciated that in alternate embodiments opening 280 can be formed on bottom surface 236 of second projection portion 202 and post 240 can alternatively extend up from top wall 254 of coupler 104. Furthermore, although post 240 is shown as being integrally formed with housing 102, in other embodiments post 240 can comprise a separate structure, such as a plastic or metal rod, that is connected to housing 102 or coupler 104.

Figure 9:
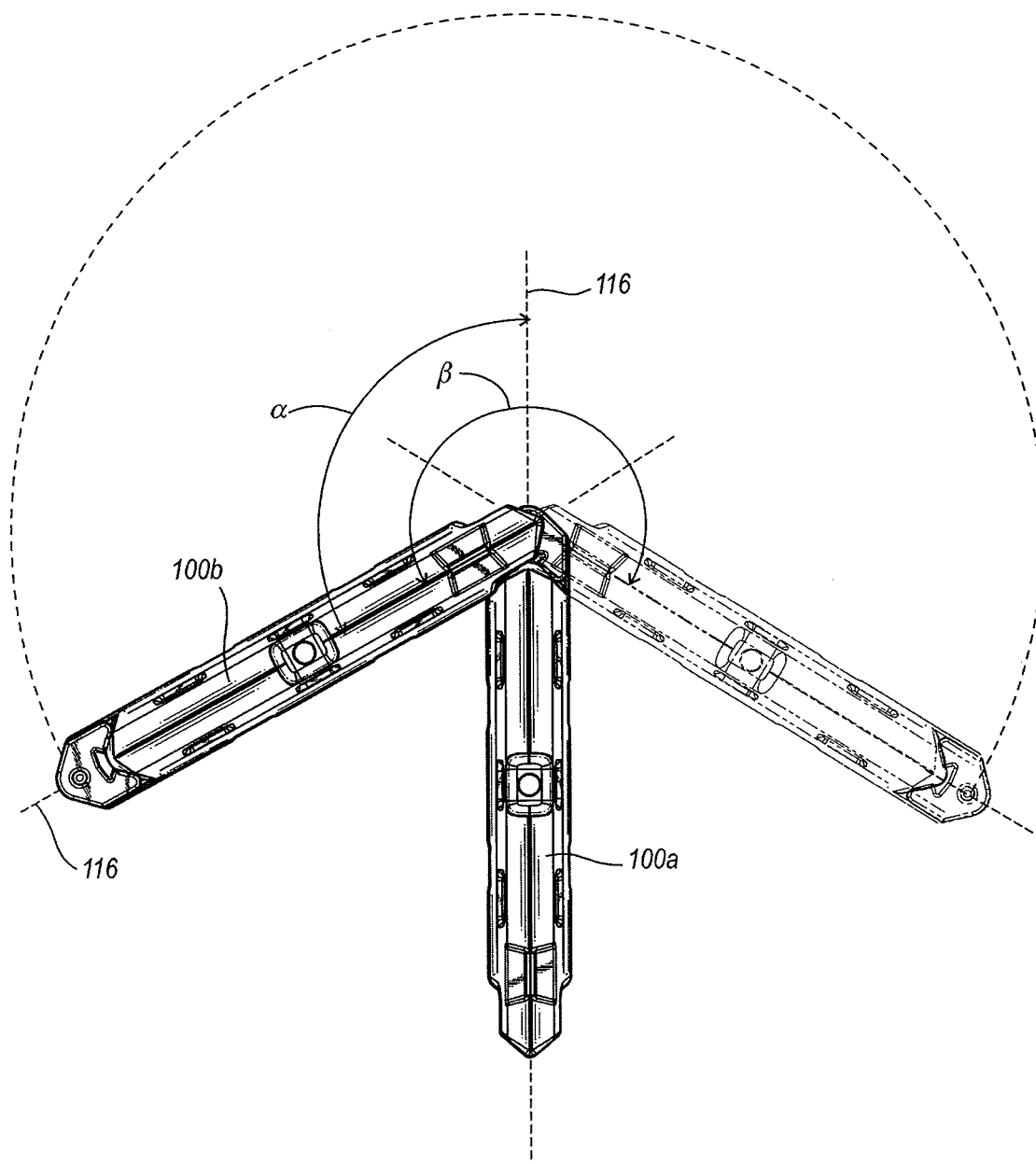
FIG. 9 is a top plan view of the coupled pair of barriers shown in FIG. 4 showing the range of angles possible when connected.

In one embodiment post 240 is designed to be rotatable within opening 280 so that barrier 100b can freely rotate relative barrier 100a about a longitudinal axis extending through post 240. This is typically accomplished by having both post 240 and opening 280 have complementary circular transverse cross-sectional configurations. However, other configurations can also be used, especially wherein opening 280 is larger than post 240. With reference to FIG. 9, with barriers 100a and 100b connected as discussed above, one of the barriers can be selectively positioned relative to the other barrier over an angle formed between the longitudinal axes 116 of the barriers. For example, the barriers can rotate relative to alignment of the central longitudinal axes 116 over an angle α that is typically greater than 45°, more commonly greater than 90°, and often greater then 120°. Likewise the barriers 100a and 100b can rotate relative to each other over a maximum angle β by an amount of at least 90°, more often at least 180°, and often greater than 240°. Other angles can also be formed. The above large angle of movement between the barriers enables a string of connected barriers 100 to be laid out in a variety of different patterns such as a continuous loop or a curved path.

Housing 102 and coupler 104 are each typically made of a resiliently deformable polymeric material having strong, semi-rigid, and energy absorbing properties. Such materials include linear or cross-linked plastics that will deform under pressure but will not fail in a brittle manner. Examples of conventional polymeric materials include polyethylene (including High Density Polyethylene (HDPE)), polyvinylchloride, nylon, polycarbonate, and polypropylene. Additives such as dyes, pigments, and reinforcements, such as fibers, can also be added to the material. Florescent dies can be added to help housing 102 and/or coupler 104 glow at night for better direction of traffic. In one embodiment, housing 102 and coupler 104 are made from a recyclable plastic such as polyethylene or HDPE. This enables old or broken barriers to be ground down and recycled into new barriers. It is appreciated that housing 102 and coupler 104 can be made from the same material or from different materials.

Figure 10:
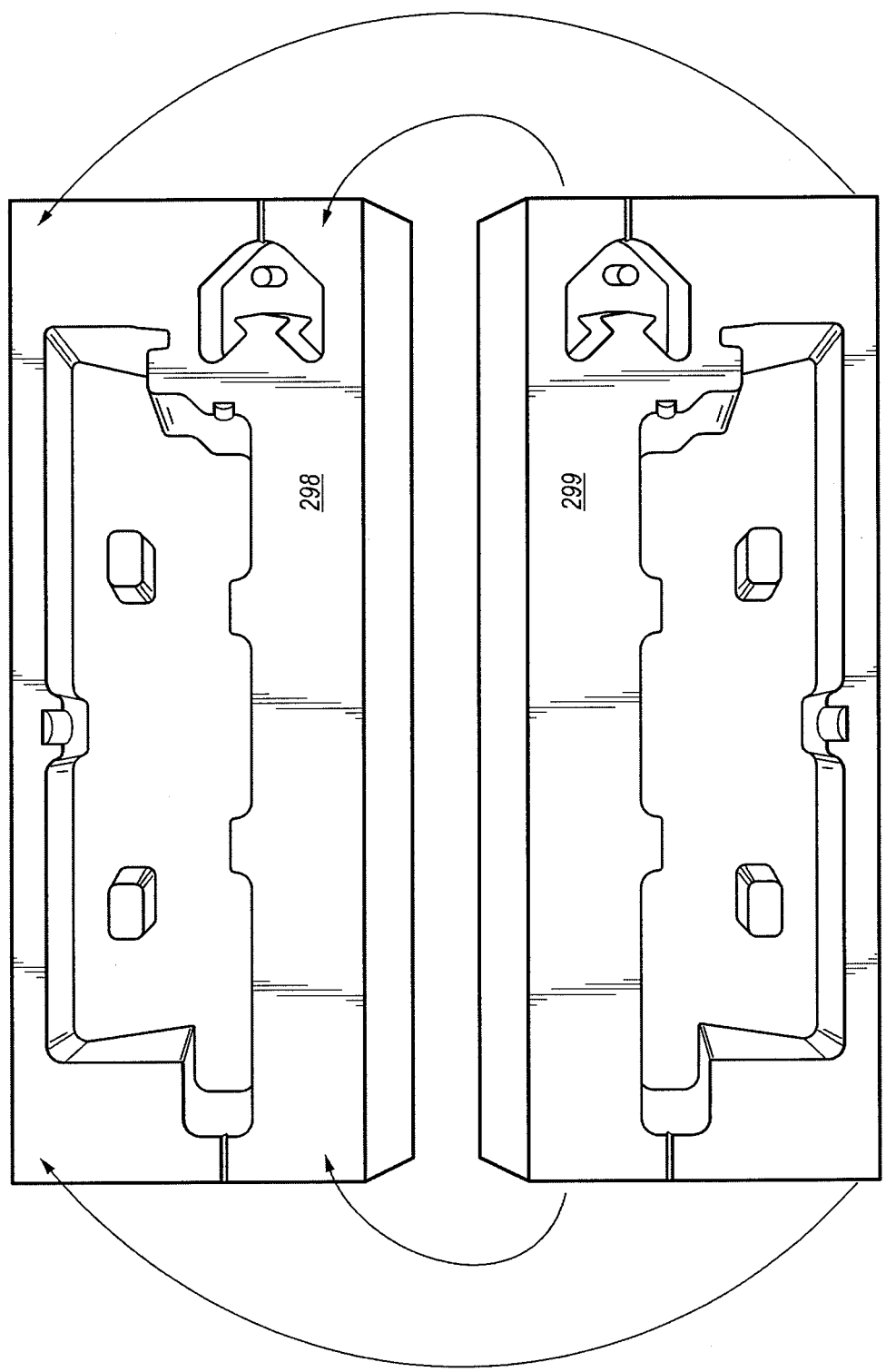
FIG. 10 is an elevational front view of two mold halves used in blow molding and barriers.

As noted above, housing 102 and coupler 104 are separate and discrete members that are connected together only after they have been formed. One of the unique benefits of the present invention is that barrier 100 can be formed from a single two part mold using a blow molding process. In contrast to using rotational molding and complex multipart molds, using a blow molding process of only two molds significantly simplifies production and reduces production costs. For example, depicted in FIG. 10 are two mold halves 298 and 299 having mold cavities for housing 102 and coupler 104. When mold halves 298 and 299 are placed together, a single housing 102 and coupler 104 can be simultaneously made using a blow molding process. In contrast, if barrier 100 was molded with coupler 104 being integrally formed as a single unit with housing 102, it would be necessary due to the placement of the different openings and projections on the barrier to use a multi-part mold having three or more parts and/or use a different molding process.

Although a single housing 102 and coupler 104 can be made from a single two part mold as shown in FIG. 10, it is also appreciated that housing 102 and coupler 104 can each be formed from separate two part molds. Furthermore, if desired, housing 102 and/or coupler 104 can be formed using molding processes such as rotational molding, injection molding, or die molding and/or the parts can be formed using multi-part molds having three or more parts. As shown in FIG. 7, an opening 292 is formed on the sidewall 208 of first projection portion 200 of housing 102. Opening 292 is formed as a result of air being blown into molds 298, 299 during the molding process to force the plastic material to fill the edges of the mold as the barrier 100 is being formed. Opening 292 is closed by a plug or other conventional methods. A similar opening 294 is formed on coupler 104 during the molding process and can be closed in a similar fashion.

Independent of the method used, it is generally desirable that housing 102 has a substantially uniform thickness T, as shown in FIG. 1, so as to minimize shrink deformation. In one embodiment, housing 102 and coupler 104 each have a thickness T in a range between about 0.2 cm to about 1.5 cm with about 0.3 cm to about 0.8 being more common. The thickness is chosen to optimize desired deflection and required strength properties. Other dimensions can also be used. Coupling 104 may or may not have the same thickness as housing 102.

Barrier 100 can vary in height, width, and length. In one embodiment barrier 100 has a maximum height extending between floor 114 and top wall 126 that is typically in a range between about 20 inches to about 30 inches with about 22 inches to about 26 inches being more common. Barrier 100 has a maximum width extending between opposing side walls 122 and 124 that is typically in a range between about 10 inches to about 20 inches with about 12 inches to about 16 inches being more common. Finally, barrier 100 has a maximum length extending between the terminal ends of first and second projection portions 200 and 202 in a range between about 80 inches to about 120 inches with about 90 inches to about 100 inches being more common. Other dimensions can also be used. The size of barrier 100 is in part dictated by the intended use.

In some embodiments, means are also provided for preventing barriers 100 from disengaging once barriers 100 have been attached. By way of example and not by limitation, as shown in FIGS. 11A and 11B, one or more straps 286 can be used to prevent barriers 100a and 100b from disengaging. In one embodiment, shown in FIG. 11A, through holes 288 and 290 are respectively formed in first projection portion 200 and second projection portion 202 of barrier 100 so that through hole 290 is above through hole 288 when barriers 100a and 100b are engaged. Through hole 288 extends through first projection portion 200 between opposing sides of perimeter sidewall 208. Similarly, through hole 290 extends through second projection portion 202 between opposing sides of perimeter sidewall 238. After barriers 100a and 100b are attached to each other using coupler 104 as described previously, strap 286 is threaded through holes 288 and 290. The ends of strap 286 are then attached to each other and selectively tightened so as to form a loop. Opposing ends of strap 286 are connected together using conventional methods such as a buckle, knot, crimp, fastener, or other conventional methods. Strap 286 prevents barriers 100a and 100b from disengaging from each other and are especially helpful in preventing vertical separation.

Alternatively or in combination, straps 286 can be used to prevent horizontal movement of barriers 100 with respect to each other. For example, in FIG. 11B, a strap 286 is threaded through holes 132 disposed on separate barriers 100a and 100b, and selectively tightened as described above. Strap 286 prevents barriers 100a and 100b from disengaging from each other by preventing horizontal movement between the barriers.

Although the embodiments depicted in FIGS. 11A and 11B show straps and through holes disposed so as to substantially prevent movement in the vertical and horizontal directions, it is appreciated that the through holes can also be disposed so as to prevent movement in a combination of vertical and horizontal directions. For example, through holes 288 and 290 can be laterally moved away from each other so as to form an angle between them that is between horizontal and vertical, such as 30 degrees, 45 degrees or 60 degrees. Other angles are also possible.

It is also appreciated that more than one strap can be used between each barrier. For example, one could use a strap 286 in the vertical direction (as shown in FIG. 11A) and a separate strap 286 in the horizontal direction (as shown in FIG. 11B) at the same time between the same barriers 100a and 100b. In still other embodiments, in contrast to having straps 286 pass through a through hole, opposing ends of one or more straps 286 can be directly secured to barriers 100a and 100b. Straps 286 can be secured to barriers 100 using bolts, screws, or other conventional fastening techniques. Strap 286 can be made of plastic, metal, rubber, or any other strap material known in the art. Furthermore, strap 286 can comprise a rope, tie, band, strap, cord, or the like.

In an alternative embodiment of the means for preventing the barriers from disengaging, a locking mechanism can be used. For example, a key and keyway configuration can be used, as shown in FIGS. 12 and 13. This alternative embodiment can be used in place of or in conjunction with straps 286, as described above. In the depicted embodiment of FIG. 12, a locking member 300 radially extends away from bottom end 243 of post 240. Locking member 300 has an end surface 302 and a side wall 304 extending from post 240 to end surface 302. At least a portion of side wall 304 is typically substantially orthogonal to perimeter sidewall 244 of post 240. Locking member 300 can be attached to or integrally formed with post 240 and can have a square, rectangular, circular, or other cross sectional shape. Locking member 300 and post 240 together combine to form a key 306.

Coinciding with locking member 300 disposed on post 240, coupler 104 includes a receiving notch 310 formed on top wall 254 and extending toward bottom wall 256. Receiving notch 310 is formed so as to radially extend from opening 280.

As shown in the bottom view of coupler 104 depicted in FIG. 13, an annular channel 320 is formed in a portion of sidewall 284 of opening 280. Channel 320 is bounded by an annular sidewall 322 and a ledge 324 extending from sidewall 284 to sidewall 322. Channel 320 is configured to communicate with receiving notch 310. Channel 320 is configured to have a larger diameter than opening 280 so that ledge 324 faces the bottom wall 256 of coupler 104. Opening 280, receiving notch 310, and channel 320 together combine to form a keyway 326 configured to receive key 306.

During use, coupler 104 is attached to housing 102 of first barrier 100a in the manner described above. Second barrier 100b is then positioned and rotated with respect to first barrier 100a so that key 306 is positioned over keyway 326 and locking member 300 is aligned with receiving notch 310, as shown in FIG. 12. Key 306 is then lowered into keyway 326 so that locking member 300 is received within receiving notch 310. As second barrier 100b is lowered, locking member 300 is received within the portion of channel 320 that is directly below receiving notch 310. Second barrier 100b is then rotated with respect to first barrier 100a about key 306, causing locking member 300 to move along annular channel 320 so that locking member 300 becomes no longer aligned with receiving notch 310. Once this misalignment occurs, locking member 300 is prevented from vertical disengagement from coupler 104 because locking member 300 will contact ledge 324 when barrier 100b is moved vertically with respect to barrier 100a, preventing locking member 300 from being removed from channel 320.

When removal of key 306 from keyway 326 is desired, second barrier 100b is rotated with respect to first barrier 100a back to the original position in which locking member 300 once again aligns with receiving notch 310. Once aligned, locking member 300 can be removed from opening 280 by lifting second barrier 100b which removes key 306 from keyway 326.

Returning to FIG. 1, light assembly 106 can be attached to housing 102 as required by some government guidelines or to simply aid visibility in low light or night conditions. Light assembly 106 is configured to couple with a first coupling disposed on barrier housing 102. In one embodiment the first coupling can comprise a stem having internal or external threads, such as threaded stem 162 discussed above with regard to FIG. 3. Alternatively, the first coupling can simply comprise threads 194 or 196 disposed on or within stem 162 or housing 102 as previously discussed with regard to FIGS. 3-5. As discussed below in greater detail, the first coupling can also have a variety of other configurations.

Figure 15:
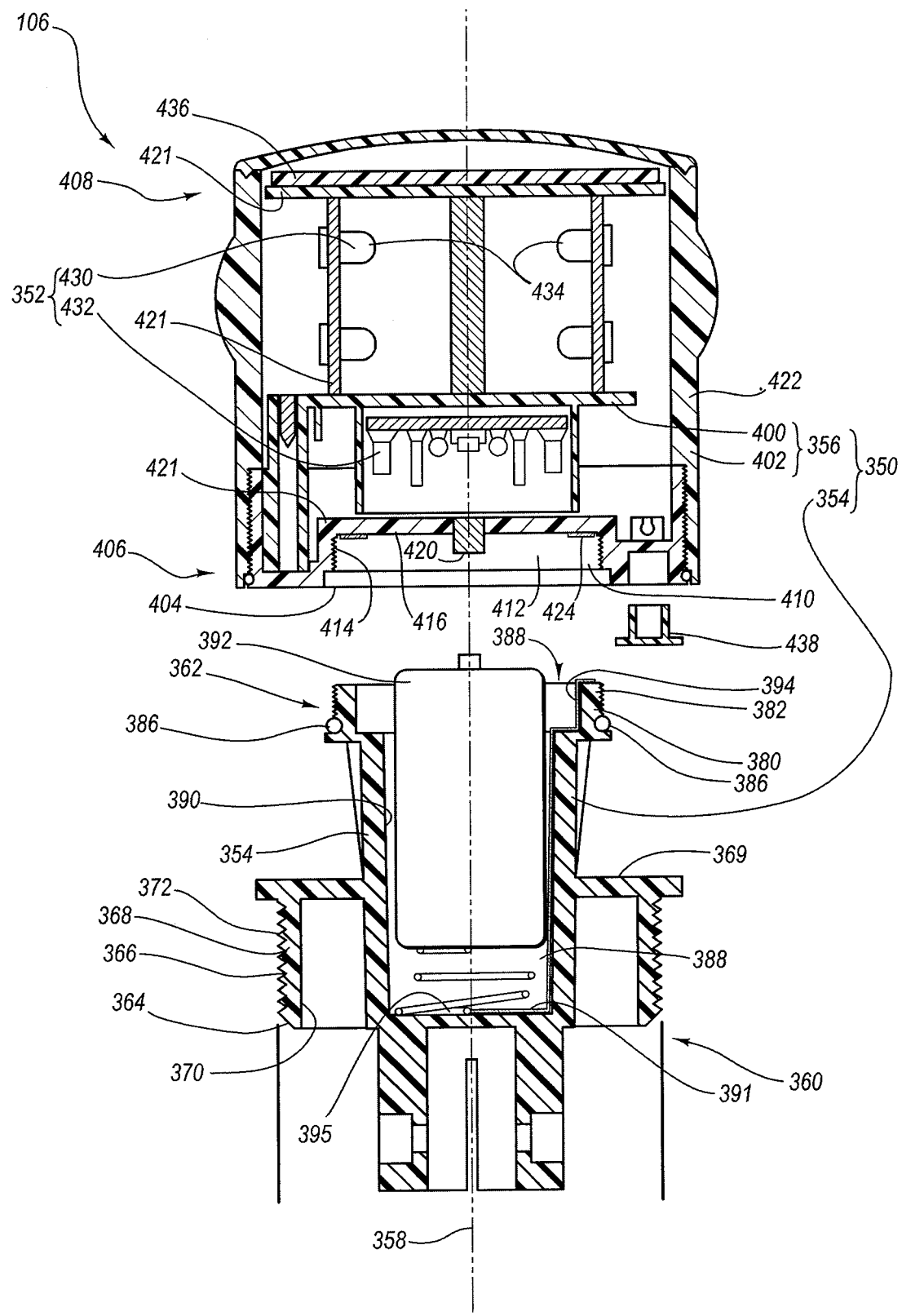
FIG. 15 is an exploded cross sectional view of a light assembly according to the present invention.

As depicted in FIG. 15, light assembly 106 comprises a housing 350 and a light source 352 coupled with housing 350. Housing 350 is configured to couple with the first coupling on barrier housing 102.

Figure 16:
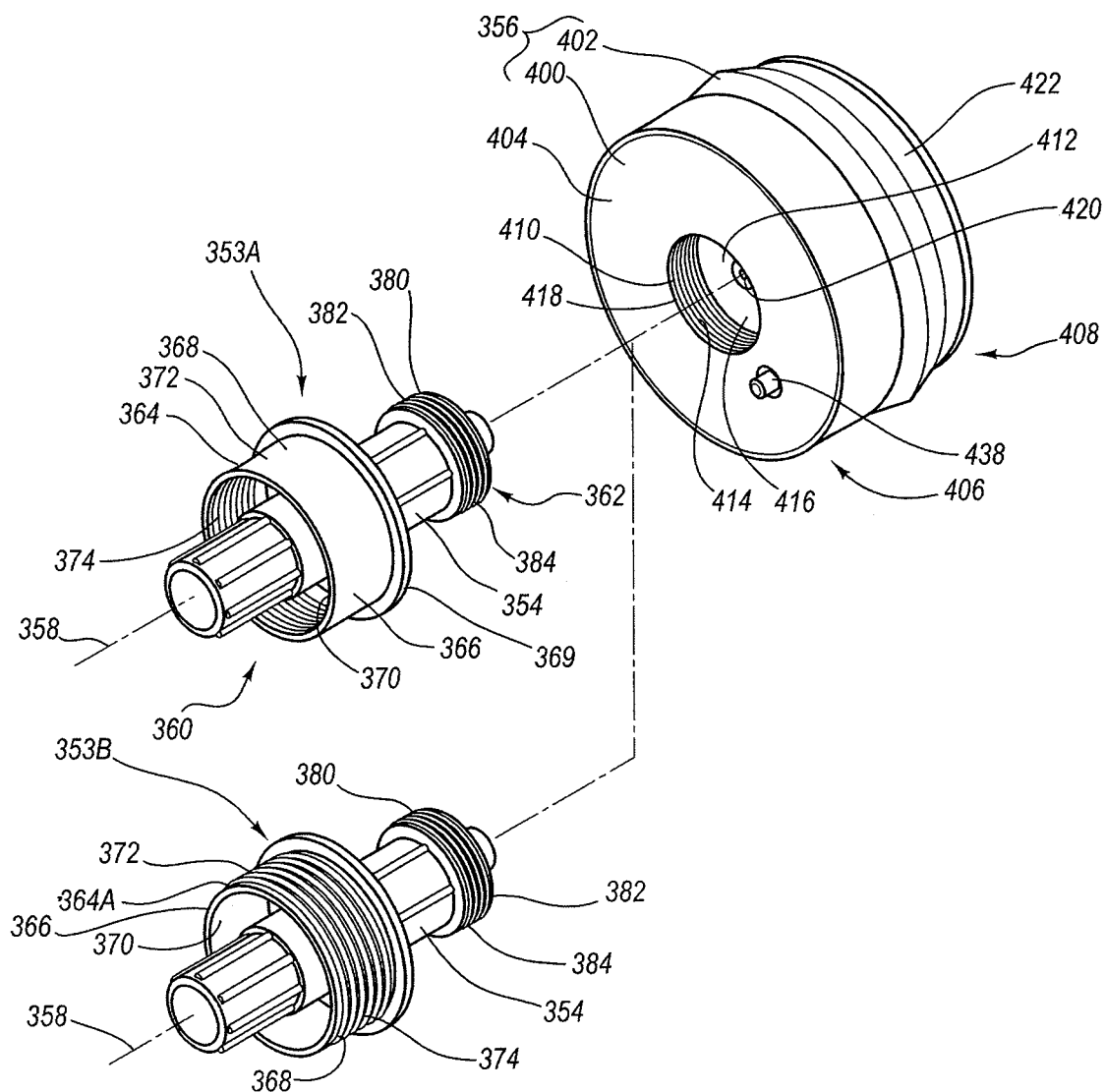
FIG. 16 is a bottom perspective view of a light assembly showing a lens assembly and two embodiments of a stem that can be used with the lens assembly.

Turning to FIG. 16 in conjunction with FIG. 15, housing 350 comprises an elongated stem assembly 353 and a lens assembly 356 mounted thereto. FIG. 16 shows two embodiments (353A and 353B) of stem assembly 353 that can be used with lens assembly 356. Stem assembly 353A comprises an elongated stem 354 having a central longitudinal axis 358 extending from a first end 360 to an opposing spaced apart second end 362. A second coupling 364 is formed on or attached to stem 354, typically at first end 360. Second coupling 364 is configured to removably secure to the first coupling formed on barrier housing 102. To this end, second coupling 364 is the mating equivalent to the first coupling.

For example, second coupling 364 comprises a cylindrical sleeve 366 having an annular sidewall 368 that encircles stem 354 and an annular flange 369 that extends between sidewall 368 and stem 354. Sidewall 368 has an inside surface 370 facing toward stem 354 and an opposing outside surface 372 facing away from stem 354. As shown in FIG. 16, a helical thread 374 is formed on inside surface 370. As a result, second coupling 364 can be selectively threaded onto threaded stem 162 (which is one embodiment of a first coupling) extending from housing 102 (FIG. 3).

Stem assembly 353B is substantially the same as stem assembly 353A (like elements being identified by like reference characters) except that stem assembly 353B comprises a second coupling 364A where threads 374 are mounted on outside surface 372 of sidewall 368. As a result of this configuration, second coupling 364A can threadedly couple with the embodiment of stem 162 depicted in FIG. 4 or threads 196 depicted in FIG. 5. It is appreciated that second coupling 364, 364A can be a separate device that is attached to stem 354 before use, or can be integrally formed as a unitary member with stem 354. Furthermore, second coupling 364, 364A can be fixed to stem 354 so that stem 354 and second coupling 364, 364A rotate concurrently or second coupling 364, 364A can be configured to independently rotate about stem 354.

A first attaching member 380 is disposed at second end 362 of stem 354. First attaching member 380 is configured to couple with lens assembly 356. As depicted, first attaching member 380 has an annular perimeter sidewall 382 encircling and facing away from longitudinal axis 358. Perimeter sidewall 382 has a helical thread 384 formed thereon. A gasket, washer, o-ring, or the like, such as o-ring 386, can also be mounted on attaching member 380 so as to provide a substantially watertight connection.

Returning to FIG. 15, stem 354 bounds a bore 388 extending into stem 354 along longitudinal axis 358 from second end 362. In the depicted embodiment, bore 388 extends from second end 362 of stem 354 toward first end 360 and is bounded by an interior sidewall 390 and an end wall 391. Bore 388 is sized so that one or more batteries 392 can be inserted therein. A metal spring 395 is mounted on end wall 391 so as to facilitate electrical contact with battery 392. An electrical contact 394 extends from spring 395 to the mouth of bore 388 to bring battery 382 into electrical contact with light source 352 when stem 354 is coupled with lens assembly 356.

Lens assembly 356 comprises a lens housing 400 in which light source 352 is disposed and a lens 402 mounted to lens housing 400. Lens housing 400 extends from a first end face 404 at a first end 406 to a spaced apart second end 408. Disposed at first end 406 of lens housing 400 is a second attaching member 410, configured to couple with first attaching member 380 disposed on stem 354.

As shown in FIG. 16, second attaching member 410 comprises a threaded bore 412 extending from first end face 404 toward second end 408 of lens housing 400. Bore 412 is bounded by a perimeter sidewall 414 and an end wall 416. A helical thread 418 is formed on perimeter sidewall 414 so as to correspond to the helical thread 384 formed on first attaching member 380. This allows first attaching member 380 to threadedly engage second attaching member 410.

Mounted on end wall 416 of threaded bore 412 is a centrally disposed electrical contact 420 that biases against the battery 392 and an annular electrical contact 424 that encircles electrical contact 420 and biases against electrical contact 394 when stem 354 couples with lens assembly 356. In this manner, battery 392 can electrically communicate with light source 352.

To couple lens assembly 356 and stem 366 together to form light assembly 106, lens assembly 356 and stem 366 are aligned along longitudinal axis 358 so that first attaching member 380 and second attaching member 410 adjoin one another. First attaching member 380 is then coupled to second attaching member 410 by rotating stem 366 relative to lens assembly 356 so that thread 384 on first attaching member 380 engages thread 418 on second attaching member 410.

It is appreciated that other types of attaching members can alternatively be employed to attach stem 354 to lens assembly 356. For example, instead of first attaching member 380 of stem 354 screwing into second attaching member 410 of lens assembly 356, the attachment mechanisms can be switched so that lens assembly 356 can include a stem that screws into a bore on stem 354. Other types of attaching members as are known in the art can also be used.

Lens 402 is disposed on lens housing 400 so as to protect light source 352 while allowing light emanating from light source 352 to shine therethrough. In the depicted embodiment, lens 402 has a substantially cylindrical sidewall 422 covering lens housing 400 so as to extend from first end 406 to second end 408 of lens housing 400. Lens 402 is attached to lens housing 400 such that lens housing 400 is covered by lens 402 except for first end face 404. Lens 402 is typically comprised of a translucent material, such as glass, plastic, or the like. Other translucent materials can also be used, as is known in the art. Lens 402 can be clear or tinted or a combination of the two.

Figure 17:
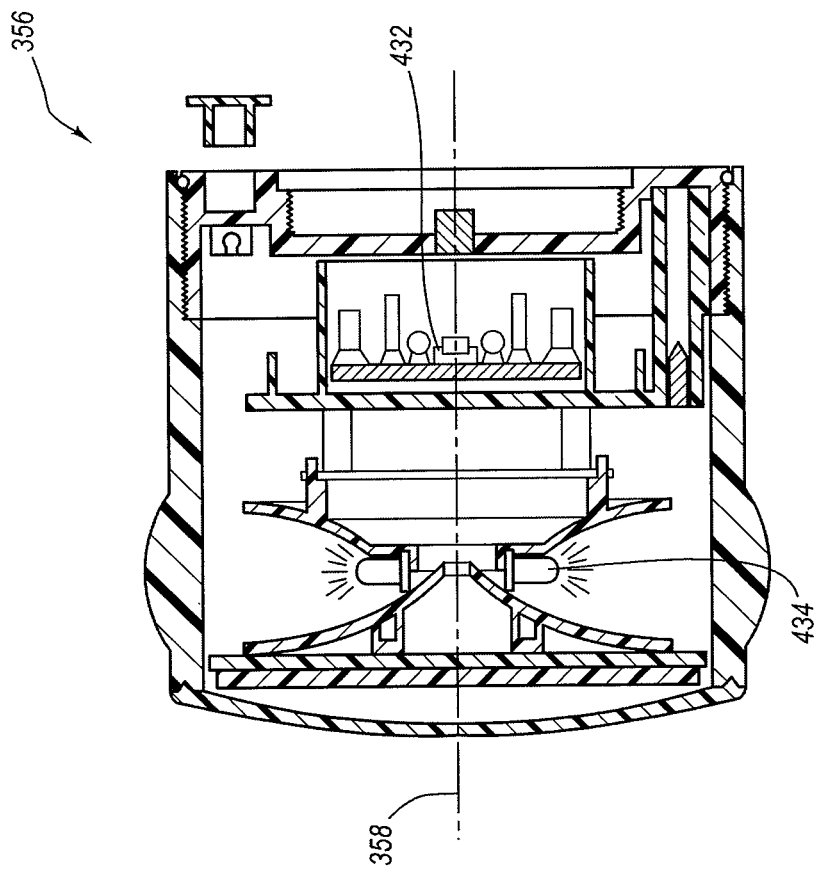
FIG. 17 is a cross sectional view of an alternative embodiment of a lens assembly according to the present invention.

As shown in FIG. 15, light source 352 comprises a light emitting device 430 and circuitry 432 to power and control the light emitting device 430. Light emitting device 430 and circuitry 432 are attached or otherwise mounted to lens housing 400. Light emitting device 430 comprises electric or electronic components that emit light when energized. In the depicted embodiment, light emitting device 430 comprises one or more light emitting diodes (LEDs) 434 situated to provide light that will shine through lens 402. In the embodiment depicted in FIG. 15, LEDs 434 are arranged so as to be facing generally toward longitudinal axis 358. It is appreciated that other arrangements of LEDs 434 can alternatively be used. For example, FIG. 17 shows an alternative embodiment in which the LEDs 434 are facing generally away from longitudinal axis 358. Other arrangements can also be used. It is appreciated that other types of light emitting devices can alternatively be used, such as incandescent light bulbs, fluorescent light bulbs, or the like, as is known in the art. LEDs 434 are selectively energized by circuitry 432 which is electrically connected thereto.

Returning to FIG. 15, circuitry 432 controls LEDs 434 to selectively emit light based on the circuitry composition, as is known in the art. For example, circuitry 432 can cause LEDs 434 to continuously emit light or periodically flash on and off. Circuitry 432 can also control the amount of time each LED 434 is energized per flash and can cause the LEDs 434 to be energized together or separate from each other. Circuitry 432 comprises electronic circuitry, as is known in the art, such as resistors, capacitors, integrated circuits, microcontrollers, and the like. Circuitry 432 can also include sensors to determine various operating conditions. For example, a light detector (not shown) can be included to detect the amount of ambient light present so that LEDs 434 are energized only when the ambient light is lower than a predetermined amount, thus saving power.

A power source is also included to provide power to circuitry 432. As noted above, one method of supplying power for circuitry 432 is via battery 392 disposed in bore 388 of stem 366. Power is transferred from batter 392 to circuitry through electrical contacts 394 and 420 disposed respectively on stem 366 and lens housing 400. In other embodiments, battery 392 can be disposed within lens housing 400.

A recharging source can also be included in the present invention. For example, in the depicted embodiment, a solar cell 436, as is known in the art, is disposed at second end 408 of lens housing 400. Solar cell 436 is covered by a portion of lens 402 so as to be protected and is situated so as to receive the rays of the sun during the daytime. An electrical connection between solar cell 436 and battery 392 is provided so that solar cell 436 can charge battery 392 during daylight hours. A switch 438 can also be provided to turn the light source on and off. Switch 438 is connected so as to allow current from the battery 392 or other power source to flow to circuitry 432 when in a first position and to prevent current to flow to circuitry 432 when in a second position, as is known in the art.

A method of coupling light assembly 106 to barrier 100 is now given. First, light assembly 106 is assembled as discussed previously. Light assembly 106 is then positioned above inlet port 157 (FIG. 3) of barrier 100 so that longitudinal axis 358 of light assembly 106 aligns with radial center 188 of inlet port 157. Light assembly 106 is lowered until second coupling 364 contacts with a first coupling such as stem 162 form on housing 102. Light assembly 106 is then rotated in a particular direction relative to barrier 100, causing thread 374 on second coupling 364 to engage thread 194 or 196 (FIGS. 3-5) of first coupling. Continue rotation of light assembly 106 in the same direction tightens the threaded connection, securing light assembly 106 to barrier 100.

To remove light assembly 106 from barrier 100, light assembly 106 is simply unscrewed from barrier 100. To do this, light assembly 106 is rotated in the opposite direction as when tightening, which causes the threaded connection to loosen until the threads 374 and 194 or 196 are separated.

The inventive light assembly provides unique benefits in that it enables the light assembly to be easily mounted on the barrier by hand without the need of fasteners, such as bolt, screws, or clamps, and because it does not require the use of a separate tool for attaching. However, if it is desire to further secure the light assembly to the barrier, separate fasteners or locks can be used. Furthermore, by coupling the light source with the inlet port, the light source eliminates the need for a separate cap, thereby reducing cost and the need for extra parts.

Figure 18:
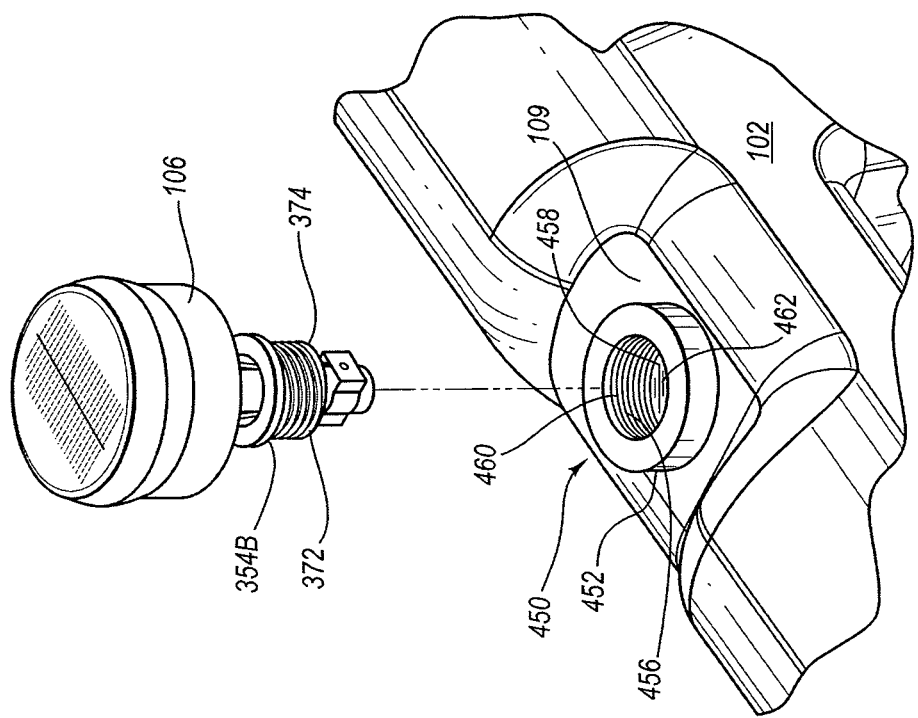
FIG. 18 is a top perspective view of the light assembly of FIG. 15 and a corresponding first coupling, in an uncoupled state, according to the present invention.

Depicted in FIGS. 18-22 are various alternative embodiments of means for mounting the light assembly to the barrier by rotation of the light assembly relative to the barrier. Like elements between the alternative embodiments and the previously discussed embodiments are identified by like reference characters. In FIG. 18, an alternative embodiment of a first coupling 450 is depicted. First coupling 450 comprises an annular stem 452 outwardly projecting from exterior surface 109 of housing 102. Stem 452 has an inside surface 456 that bounds an opening 458. A thread 460 is formed on inside surface 456. In contrast to inlet port 157 (FIG. 3), opening 458 does not extend through housing 102 so as to communicate with internal chamber 110. That is, first coupling 450 is not a part of an inlet port used to fill up barrier 100 with ballast. Instead, opening 458 is bounded by an end wall 462 so as to form a closed socket or blind hole. Light assembly 106 can couple with stem 452 in a similar fashion as described above with respect to stem 162. That is, helical thread 374 formed on outside surface 372 of sleeve 366 (FIG. 16) can engage threaded inside surface 456 of stem 452. It is appreciated that stem 453 can be located at any location on barrier 100. It is also appreciated that stem 452 can be formed with threads on the exterior surface thereof for engagement with light assembly 106.

Figure 19:
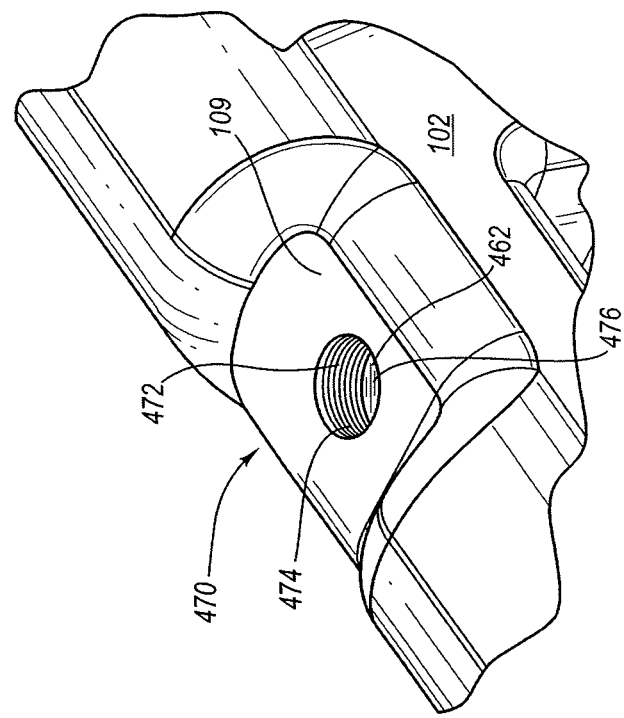
FIG. 19 is a top perspective view of an alternative embodiment of a first coupling according to the present invention.

In FIG. 19, another alternative embodiment of a first coupling 470 is depicted. First coupling 470 is similar to first coupling 450 except that first coupling 470 does not have a stem. Instead, first coupling 470 comprises a thread 472 formed on an inside surface 474 formed directly in housing 102. Inside surface 474 bounds an opening 476 that terminates at end wall 462 so as to form a closed socket. Light assembly 106 can couple with first coupling 470 in a similar fashion as described above with respect to first coupling 450. That is, helical thread 374 formed on outside surface 372 of stem 354B (FIG. 16) can engage threaded inside surface 474 of housing 102. Again, first coupling 470 can be formed at any location on barrier 100.

Figure 21:
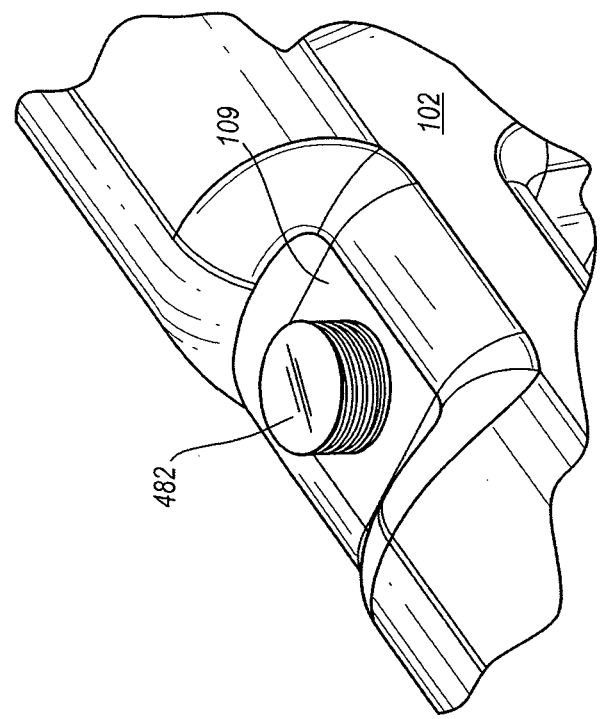
FIG. 21 is a top perspective view of another alternative embodiment of a first coupling according to the present invention.
Figure 20:
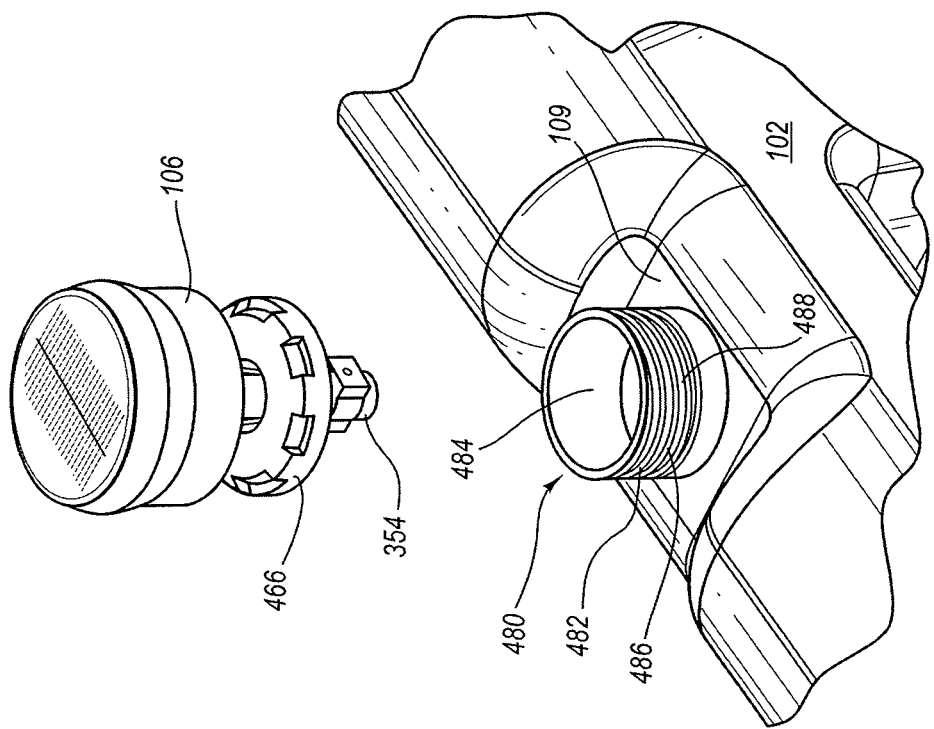
FIG. 20 is a top perspective view of an alternative embodiment of a light assembly and corresponding first coupling, in an uncoupled state, according to the present invention.

FIGS. 20 and 21 depict alternative embodiments of the first coupling in which threads are disposed on the outer surface of the first coupling. For example, in FIG. 20, a first coupling 480 comprises a stem 482 outwardly projecting from exterior surface 109 of housing 102, bounding an opening 484, similar to first coupling 450. In contrast to thread 460 being formed on inside surface 456 of stem 452, however, thread 486 is formed on an outside surface 488 of stem 482. Light assembly 106 can couple with stem 482 in a similar fashion as described above with respect to stem 162. That is, helical thread 374 formed on inside surface 370 of stem assembly 354A (FIG. 16) can engage threaded outside surface 488 of stem 482. Alternatively, as shown in FIG. 20, a second coupling 446 can be rotatably mounted on stem 354. A flange (not shown) outwardly projects from stem 354 below second coupling 446 to prevent second coupling 446 from sliding off of stem 354. Second coupling 446 comprises a threaded cap that can be screwed onto stem 482 while stem 354 remains stationary, thereby securing light assembly 106 to housing 102. As shown in FIG. 21, stem 482 can alternatively be solid or at least not have an opening extending down from the top thereof.

As noted above, the alternatives shown in FIGS. 18-21 correspond to first couplings that are not used in conjunction with filling the barrier with a ballast. As a result, the stems and openings associated with first couplings 450, 470, and 480 can be sized differently than stem 162 and inlet port 157 (FIG.

3) that is used to fill barrier 100 with ballast. That is, the size of the first couplings that are only used to secure a light source can be a different size than the couplings or ports used to receive ballast. In some embodiments, openings 458, 476, and/or 484 associated with first couplings 450, 470, 480 are smaller than inlet port 157. In other embodiments, openings 458, 476, and/or 484 are larger than inlet port 157.

Figure 22:
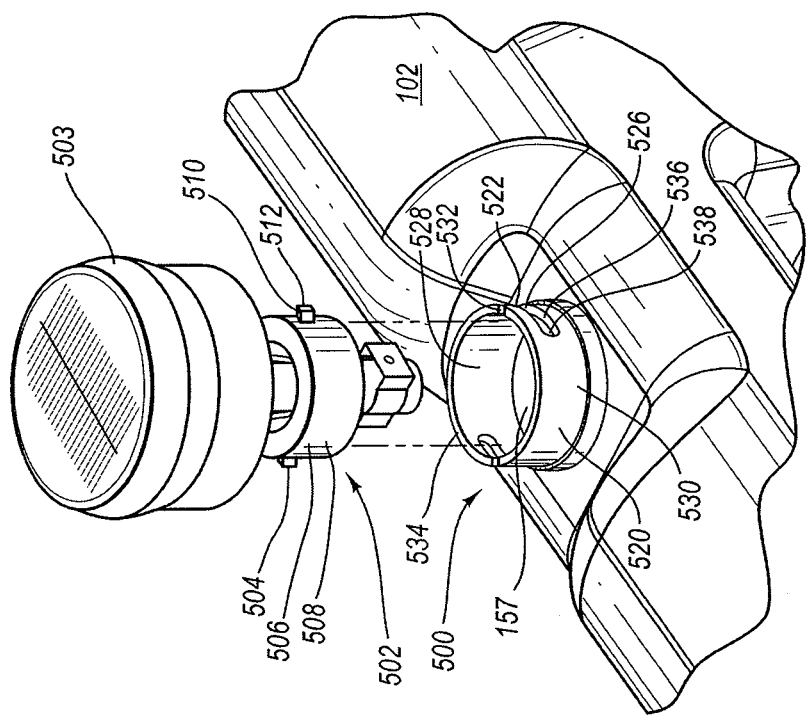
FIG. 22 is a perspective view of an alternative embodiment of a light assembly and corresponding inlet port, in an uncoupled state, according to the present invention.

In FIG. 22, another alternative embodiment of means for mounting the light assembly to the barrier is depicted. A first coupling 500 disposed on barrier housing 102 and a second coupling 502 disposed on a light assembly 503 are configured to mate together using a bayonet connection. Second coupling 502 is similar to second coupling 364, except that instead of a thread 374 disposed on the inside surface 370 or outside surface 372 of sidewall 368, second coupling 502 includes one or more bayonet prongs 504 outwardly projecting from outside surface 506 of sidewall 508. In the depicted embodiment two bayonet prongs 504 are formed on sidewall 508 so as to be diametrically opposed to one another. In other embodiments a single prong 504 can be used. In still other embodiments three or more prongs can be used. Each prong 504 has a perimeter wall 510 that extends from outside surface 506 to an end face 512.

First coupling 500 is similar to first coupling 184, except that instead of a thread 194 disposed on the inside surface 190 or outside surface 192 of stem 452, first coupling 500 includes one or more bayonet slots 522 disposed on stem 520. Each slot 522 is configured to receive and secure a separate bayonet prong 504. Each slot 522 is bounded by a perimeter wall 526 extending through stem 520 between inside surface 528 and outside surface 530. Slot 522 has a mouth 532 at a rim 534 of stem 520 and forms a substantially L-shaped channel 536 having an end position 538 at the end of the channel. Slot 522 is shaped and sized so as to allow bayonet prong 504 disposed on second coupling 502 to be received therein and become secured within slot 522 by rotating second coupling 502 relative to first coupling 500. This type of connection is known as a "bayonet connection" in the art. Two bayonet slots 522 are used in the depicted embodiment, positioned to receive the two bayonet prongs 504 formed on second coupling 502. Although two slots 522 are shown, one or three or more slots 522 can alternatively be used to match the number of prongs 504.

To secure first and second couplings 500 and 502 together, light assembly 503 is positioned above barrier 100 so that prongs 504 of second coupling 502 are positioned over slot mouths 532 of first coupling 500. Light assembly 503 is lowered so that prongs 504 are received within channels 536. Light assembly 503 is then rotated relative to barrier 100 to move prongs 504 to the end position 538 of the channel 536, securing light assembly 503 to barrier 100.

As depicted, first coupling 500 is associated with inlet port 157, similar to first coupling 184. In other embodiments, first coupling 500 is not associated with inlet port 157 and instead has an end wall, similar to alternative embodiments discussed previously.

Also, although the bayonet connection depicted in FIG. 22 discloses bayonet prongs 504 formed on second coupling 502 and bayonet slots 522 formed in first coupling 500, it is appreciated that this can be reversed. That is, in one embodiment bayonet prongs 504 are formed on first coupling 500 of barrier housing 102 and bayonet slots 522 are formed in second coupling 502 of light assembly 503.

Figure 23:
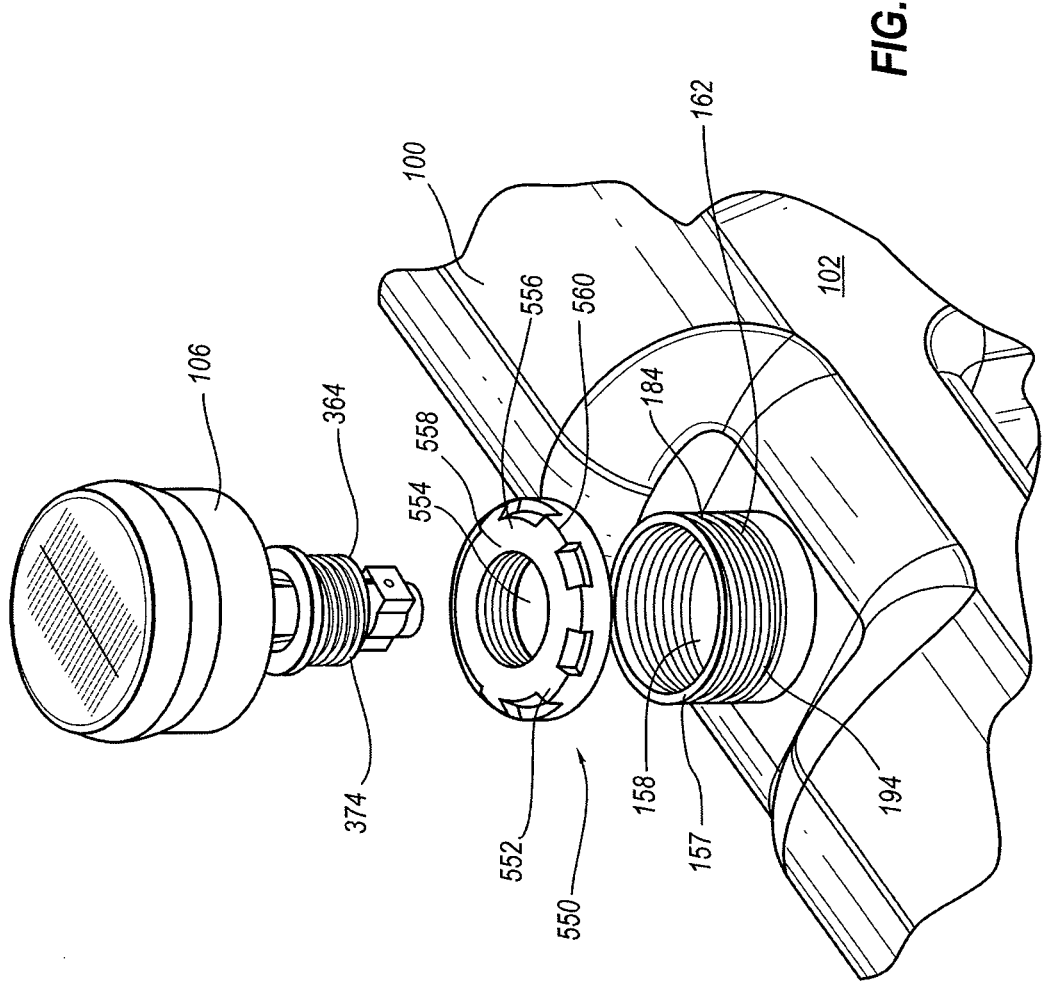
FIG. 23 is a top perspective view of the light assembly of FIG. 15, an adapter, and a corresponding inlet port, in an uncoupled state.
Figure 24:
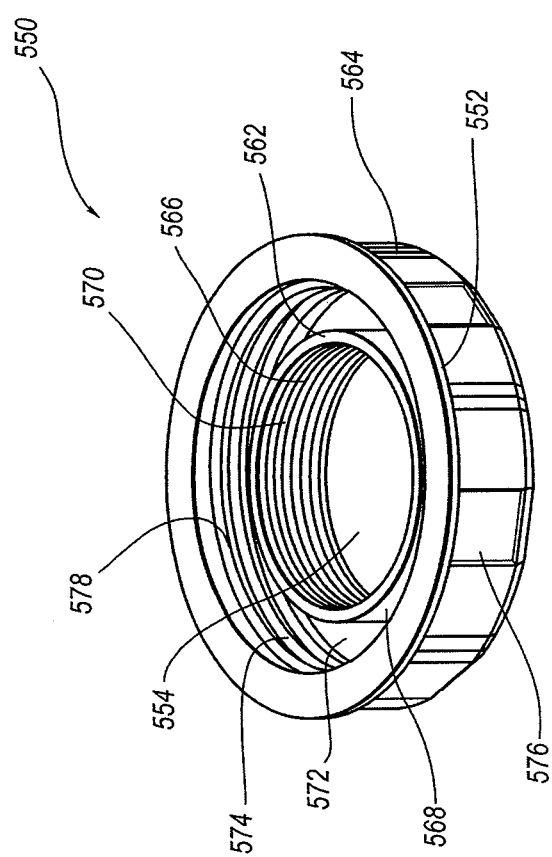
FIG. 24 is a bottom perspective view of the adapter shown in FIG. 23.

FIG. 23 discloses an alternative embodiment of means for mounting the light assembly 106 to barrier 100 using an adapter 550 between the first and second couplings. This embodiment can be used, for example, when inlet port 157 has a greater diameter than the outside surface 372 of second coupling 364. As shown in FIGS. 23 and 24, adapter 550 comprises a body 552 encircling and bounding an opening 554. Body 552 comprises an annular top wall 556 extending between an annular inner edge 558 and an annular outer edge 560. Body 552 further comprises an inner sidewall 562 and an outer sidewall 564 extending downward from top wall 556.

Inner sidewall 562 extends downward from top wall 556 at inner edge 558 so as to encircle opening 554. Inner sidewall 562 comprises an inner surface 566 which defines opening 554 and an opposing outer surface 568 facing away from opening 554. A helical thread 570 is formed on inner surface 566 of inner sidewall 562. Thread 570 is configured to be the mating equivalent of thread 374 formed on second coupling 364 of light assembly 106.

Outer sidewall 564 extends downward from top wall 556 at outer edge 560 so as to form an annular channel 572 between inner and outer sidewalls 562 and 564. Outer sidewall 564 comprises an inner surface 574 facing toward inner sidewall 562 and an opposing outer surface 576 facing away from inner sidewall 562. A helical thread 578 is formed on inner surface 574 of outer sidewall 564. Thread 578 is configured to be the mating equivalent of thread 194 formed on stem 162 of barrier 100.

To couple light assembly 106 to barrier 100 using adapter 550, light assembly 106 is first coupled to adapter 550 by threadedly engaging thread 374 of second coupling 364 to thread 570 formed on inner sidewall 562 and rotating light assembly 106 relative to adapter 550. The coupled light assembly/adapter is then coupled to barrier 100 by threadedly engaging thread 578 formed on outer sidewall 564 of adapter 550 to thread 194 of stem 162 and rotating the coupled light assembly/adapter relative to barrier 100. Alternatively, adapter 550 may first be coupled to barrier 100 before light assembly 106 is coupled to adapter 550. In that embodiment, adapter 550 is coupled to barrier 100 as described above, except without light assembly 106 being coupled thereto. After adapter 550 has been coupled to barrier 100, light assembly 106 is then coupled to adapter 550 as described above.

It is appreciated that other alternative embodiments using adapters are also possible. For example, in one embodiment, instead of thread 578 being formed on inner surface 574 of outer sidewall 564, thread 578 is formed on outer surface 576 of outer sidewall 564 so as to be able to couple with a first coupling having a thread formed on an inside surface (see, e.g., FIG. 4). Adapter 550 can also be configured to be used with a bayonet connection.

In view of the foregoing, it is appreciated that various embodiments of the present invention have a number of unique benefits. For example, select embodiments can be easily produced by blow molding and allow a separate and discrete coupler to be used in coupling two barriers together. By doing so, manufacturing costs can be kept down and the number of potential errors can be diminished.

Also, in select embodiments, a light assembly can be attached to the barrier without the use of external fasteners, such as screws, clamps, and the like. This simplifies inventory because less parts need to be maintained. It also simplifies assembly because no external tools are needed, such as wrenches, screwdrivers, etc. The light assembly is simply rotated by the assembler to attach the fixture to the barrier. Furthermore, the light assembly can also function as a copy of the inlet port of the barrier, thereby avoiding the need for a separate cap.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A barrier comprising:
a housing having an interior surface bounding a chamber that is adapted to receive a ballast, the housing comprising:
a central body portion extending between a first end face and an opposing second end face, the central body portion including a floor extending along the length thereof;
a first projection portion outwardly projecting from the first end face of the central body portion, the first projection portion having a top surface;
a second projection portion outwardly projecting from the second end face of the central body portion, the second projection portion having a bottom surface; and
a post downwardly projecting from the bottom surface of the second projection portion, wherein the central body portion, first projection portion, second projection portion and post are all integrally molded together as a unitary structure; and
a coupler interconnected to the first end face of the central body portion or the first projection portion of the housing so as to be disposed on the top surface of the first projection portion, the housing and the coupler comprising separate discrete members that are rigidly connected together after formation; the coupler further comprising:
means for removably connecting a second identical said barrier to the coupler, the means for removably connecting comprising an opening formed in a top surface of the coupler, the opening being vertically aligned with and is vertically above the first projection portion when the floor of the central body portion is disposed on a ground surface, the opening being sized and shaped to receive said post from a second identical said barrier.

2. The barrier as recited in claim 1, wherein the coupler is removably connected to the housing.

3. The barrier as recited in claim 1, wherein the coupler has an interior surface bounding a compartment, the compartment being separate from the opening on the coupler.

4. The barrier as recited in claim 1, wherein the housing further comprises an inlet port and an outlet port, a plug being coupled with the outlet port.

5. The barrier as recited in claim 1, further comprising a locking member outwardly projecting from the first end face of the central body portion for retaining the coupler on the first projection portion.

6. The barrier as recited in claim 1, wherein the bottom surface of the second projection portion has an elevational location higher than the top surface of the first projection portion when the floor of the central body portion is disposed on a ground surface.

7. The barrier as recited in claim 1, further comprising:
a tenon projecting from the first end face of the central body portion or from the top surface of the first projection portion; and
a mortise recessed on the coupler, the tenon being received within the mortise.

8. The barrier as recited in claim 1, wherein the post comprises a key and the opening on the coupler comprises a matching keyway formed on a top surface of the coupler.

9. A barrier system comprising:
a first barrier comprising:
a first housing having an interior surface bounding a chamber that is adapted to receive a ballast, the first housing comprising:
a central body portion extending between a first end face and an opposing second end face, the central body portion including a floor extending along the length thereof;
a first projection portion outwardly projecting from the first end face of the central body portion, the first projection portion having a top surface;
a second projection portion outwardly projecting from the second end face of the central body portion, the second projection portion having a bottom surface; and
a post downwardly projecting from the bottom surface of the second projection portion, wherein the central body portion, first projection portion, second projection portion and post are all integrally molded together as a unitary structure; and
a first coupler interconnected to the first end face of the central body portion or the first projection portion of the first housing so as to be disposed on the top surface of the first projection portion, the first housing and the first coupler comprising separate discrete members that are rigidly connected together after formation, the first coupler comprising an opening being formed in a top surface of the first coupler; and
a second barrier comprising:
a second housing having an interior surface bounding a chamber that is adapted to receive a ballast, the second housing comprising:
a central body portion extending between a first end face and an opposing second end face, the central body portion including a floor extending along the length thereof;
a first projection portion outwardly projecting from the first end face of the central body portion, the first projection portion having a top surface;
a second projection portion outwardly projecting from the second end face of the central body portion, the second projection portion having a bottom surface; and
a post downwardly projecting from the bottom surface of the second projection portion, wherein the central body portion, first projection portion, second projection portion and post are all integrally molded together as a unitary structure; and
a second coupler interconnected to the first end face of the central body portion or the first projection portion of the second housing so as to be disposed on the top surface of the first projection portion, the second housing and the second coupler comprising separate discrete members that are rigidly connected together after formation, the second coupler comprising an opening being formed in a to surface of the second coupler, the post of the first barrier being received within the opening on the second coupler of the second barrier so as to secure the first barrier to the second barrier.

10. The barrier system as recited in claim 9, wherein the second coupler is removably connected to the second housing.

11. The barrier system as recited in claim 9, wherein the second coupler has an interior surface bounding a compartment, the compartment being separate from the opening on the second coupler.

12. The barrier system as recited in claim 9, wherein the first housing further comprises an inlet port and an outlet port, a plug being coupled with the outlet port.

13. The barrier system as recited in claim 9, further comprising a locking member outwardly projecting from the first end face of the central body portion of the first housing for retaining the first coupler on the first projection portion of the first housing.

14. The barrier system as recited in claim 9, wherein the bottom surface of the second projection portion of the first housing has an elevational location higher than the top surface of the first projection portion of the first housing when the floor of the central body portion of the first housing is disposed on a ground surface.

15. The barrier system as recited in claim 9, further comprising:
  a tenon projecting from the first end face of the central body portion or from the top surface of the first projection portion of the second housing; and
  a mortise recessed on the second coupler, the tenon being received within the mortise.

16. The barrier system as recited in claim 9, wherein the post of the first barrier comprises a key and the opening on the second coupler of the second barrier comprises a matching keyway formed on a top surface of the second coupler.

\* \* \* \* \*